(12) United States Patent
Li et al.

(10) Patent No.: US 8,060,458 B2
(45) Date of Patent: *Nov. 15, 2011

(54) METHOD AND SYSTEM OF KNOWLEDGE COMPONENT BASED ENGINEERING DESIGN

(75) Inventors: Yi-Zhang Li, Beijing (CN); Zhen-Hua Wang, Beijing (CN); Yuan-Yu Chen, Beijing (CN); Xin Xu, Beijing (CN); Chao Su, Beijing (CN)

(73) Assignee: Sysware Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/490,904

(22) Filed: Jun. 24, 2009

(65) Prior Publication Data

US 2010/0121806 A1 May 13, 2010

Related U.S. Application Data

(63) Continuation of application No. 12/358,513, filed on Jan. 23, 2009.

(30) Foreign Application Priority Data

Nov. 7, 2008 (CN) .............................. 200810225954

(51) Int. Cl.
  *G06F 17/00* (2006.01)
  *G06N 5/00* (2006.01)
  *G06G 7/48* (2006.01)
(52) U.S. Cl. ............................................. 706/45; 703/8
(58) Field of Classification Search ...................... 706/45
  See application file for complete search history.

(56) References Cited

U.S. PATENT DOCUMENTS 5,799,293 A 8/1998 Kaepp
6,477,517 B1 11/2002 Limaiem et al.
(Continued)

FOREIGN PATENT DOCUMENTS

GB 2365579 2/2002
(Continued)

OTHER PUBLICATIONS

Mathworks. "Simulink Model-Based and System-Based Design" Version 5. Published Jul. 2002.*

(Continued)

*Primary Examiner* — Kakali Chaki
*Assistant Examiner* — Ben Rifkin
(74) *Attorney, Agent, or Firm* — Morris Manning & Martin LLP; Tim Tingkang Xia, Esq.

(57) ABSTRACT

The present invention relates to an engineering design method and a system of implementing same. In one embodiment, the method includes a construction process of knowledge components and a design process based on the knowledge components. The knowledge components pack universal modules in the standard forms. Accordingly, the knowledge components are independent from design layouts or design processes of products, and reusable in different projects and platforms. The design process integrates a variety of software platforms via a uniform environment and calls the knowledge components to complete the engineering designs. Further, the design process defines a data relation and an execution relation of the knowledge components and establishes a relationship between the knowledge components without programming. The universal module comprises at least operations, methods, rules and/or flows of an engineering design process and engineering analysis process.

10 Claims, 16 Drawing Sheets

U.S. PATENT DOCUMENTS

| | | |
|---|---|---|
| 6,477,518 B1 | 11/2002 | Li et al. |
| 6,993,456 B2 * | 1/2006 | Brooks et al. ................ 702/183 |
| 7,024,399 B2 | 4/2006 | Sumner, II et al. |
| 7,099,727 B2 | 8/2006 | Wu et al. |
| 7,107,253 B1 | 9/2006 | Sumner, II et al. |
| 7,277,874 B2 | 10/2007 | Sumner, II et al. |
| 7,454,399 B2 | 11/2008 | Matichuk |
| 2003/0060913 A1 | 3/2003 | Turner et al. |
| 2005/0027495 A1 | 2/2005 | Matichuk |
| 2007/0174838 A1 * | 7/2007 | Cotner et al. ................ 718/100 |
| 2008/0033710 A1 | 2/2008 | Turner et al. |

FOREIGN PATENT DOCUMENTS

| | | |
|---|---|---|
| WO | 89/03092 | 4/1989 |
| WO | 2006/108061 | 10/2006 |
| WO | 2007/090033 | 8/2007 |
| WO | 2007/147166 | 12/2007 |
| WO | 2008/039565 | 4/2008 |

OTHER PUBLICATIONS

Wipke, K.B., M.R. Cuddy, and S.D. Burch. "Advisor 2.1: A user-friendly Advanced Powertrain Simulation Using a Combined Backward/Forward Approach" Aug. 1999 NREL National Renewable Energy Laboratory. Downloaded Feb. 23, 2010 http://www.nrel.gov/vehiclesandfuels/vsa/pdfs/26839.pdf.*

Harrison, Robert et al., "A Dynamic Knowledge Modeler," Artificial Intelligence for Engineering Design, Analysis and Manufacturing, 2009, 53-69, 23, Cambridge University Press, U.S.A.

Absolo, Jose Maria, "Towards a Component-based Platform for Developing Case-based Reasoning Systems," 2004, Spain.

* cited by examiner

METHOD AND SYSTEM OF KNOWLEDGE COMPONENT BASED ENGINEERING DESIGN

CROSS-REFERENCE TO RELATED PATENT APPLICATION

This application is a continuation application of a U.S. application Ser. No. 12/358,513, filed Jan. 23, 2009, entitled "METHOD AND SYSTEM OF KNOWLEDGE COMPONENT BASED ENGINEERING DESIGN," by Yi-Zhang LI, Zhen-Hua WANG, Yuan-Yu CHEN, Xin XU, and Chao SU, which itself claims priority to Chinese patent application No. 200810225954.7, filed Nov. 7, 2008, entitled "An Engineering Design Method Based on Knowledge Components", by Yi-Zhang Li et al., which is incorporated herein by reference in its entirety.

FIELD OF THE INVENTION

The present invention relates generally to a computer aided integrating design method, and more particularly, to a method that utilizes knowledge components and data relations and an execution relations of the knowledge components to perform integrated engineering designs, and a system of implementing same.

BACKGROUND OF THE INVENTION

In a traditional design process, usually, engineers draw a preliminary design of a product in accordance with experiences, make a physical prototype based on the preliminary design, and then carry out characteristics tests or analysis on the physical prototype so as to obtain the characteristics data of the product. If these data do not meet the requirements or specifications of the product, the engineers modify the preliminary design accordingly, produce the trial products, and then test or analyze the trial products. These procedures are repeated until the product meets the desired performance requirements. For a complicated product, the whole design cycle may be very long and it may be very difficult to ensure the design quality during the long design cycle.

With the constantly development of technologies, new design methods and technologies have been emerged. For example, a computer graphic technology, a computer modeling technology, a computer analysis and simulation technology, and so on, have been applied in the engineering design. A serial of CAX tools has been developed based on these technologies. Using these methods, technologies and tools, engineers are able to establish a digitalized model of a product with no need of a physical prototype, analyze a variety of performances of the product based on the digitalized model, inspect and optimize the design of the product, and even analyze the manufacturability thereof, thereby greatly reducing the design costs and design cycle.

However, a product design usually involves multiple fields and multiple disciplines, and needs the support of a large number of special tools. Though these methods, technologies and tools may improve the efficiencies of design integration, yet these tools with different origins have different concepts, languages, technologies, data formats and use styles, and are independently used and isolated from each other in the design process, where a large number of manual operations are still needed to link up a variety of design process, thereby resulting in the low efficiency of designs. Furthermore, the models and data of different design processes are irrelevant, the corresponding design scheme is unchangeable. Accordingly, the efficiency of a design, an analysis and an optimization is still very low.

Additionally, problems to be resolved in nowadays product design are getting more and more complex, and tools used in the product design have more and more functions, thus, engineers/designers need to spend a vast amount of time and energy to understand them. Furthermore, since the operation process, knowledge, experiences and methods in the design process are not reusable and shared in new design projects, even in the similar design projects, the engineers/designers need to start over from scratch. This may result in the operational tools overloaded.

Moreover, a variety of engineering software extensively use a "hard" connection method to achieve the tool integration. The so called 'hard' connection refers to develop a special data transformation and processing module between the tools for transferring the data, and connect the tools via a plurality of data processing modules. The method has the advantages: the efficiency is very high for the special design flow or the design layout, and the matching and coordination of a variety of special data and modules is good. However, the flexibility and extendibility of the system are not good. Once the design flow or design layout changes, many intermittent data processing programs are need to be rewritten. It is also very difficult to upgrade and expand the system.

For the reuse of design knowledge and design processes, the usual practice is: carrying out the secondary development on the tool software in accordance with the requirements of the special users, integrating the specialty knowledge, the experiences of experts, design methods or design standards into the functional modules, then improving the efficiency of the tool to realize the reuse of the knowledge and design via using these functional modules. However, this customized secondary development mode has strong specialty and the threshold is very high, the development period is longer without popularity for the engineers, and is also unable to easily carry out function expansion and system maintenance.

Briefly, the conventional computer-aided integrated design methods are still unable to resolve the following problems comprehensively: a variety of tools are not integratable in the design processes, the low level repeated workload of designers are heavy, and the mutual independent links and incompact data and modules relations leads to heavy workload of the coordination and modification of designs. Therefore, it is difficult to achieve the rapid design iteration and optimization. Additionally, a variety of design and analysis tools is still operated in a traditional way. Its operation is very complex and highly relies on the user's experiences. The knowledge and experiences of using the tools can not be reused and shared in different projects. The design efficiency is usually very low.

Therefore, a heretofore unaddressed need exists in the art to address the aforementioned deficiencies and inadequacies.

SUMMARY OF THE INVENTION

In one aspect, in present invention relates to a method of an engineering design. In one embodiment, the method includes the step of constructing a plurality of knowledge components. Each knowledge component comprises one or more universal modules, Each universal module comprises at least operations, procedures, rules and flows of a corresponding engineering design process. In one embodiment, each universal module includes basic operations of file parsing, expression operations, command executions, script executions, computer-aided design (CAD) operations, computer-aided engineering (CAE) operations, database operations and report generations in a corresponding engineering design and analysis process. In one embodiment, each knowledge component is constructed to have a data interface having input and output ports, a control interface for defining a logical control relation between the knowledge component and the upstream and downstream knowledge components thereof, a human-computer interactive interface for managing data input and data output through the input and output ports of the data interface, a message interface for receiving the external message and information, and a third party tool interface for accessing a third party tool.

The method further comprises the step of defining a data relation and an execution relation of the plurality of knowledge components so as to correlate the plurality of the knowledge components to each other to form a design process model without programming. The execution relation of the plurality of knowledge components comprises logical relations, data driving relations, time characteristics, message trigging mechanisms and any combination thereof. In one embodiment, when defining the data relation of the plurality of knowledge components, a data mapping relation between the input and output ports of the plurality of knowledge components is directly defined. When calling the plurality of knowledge components, the data relation and the execution relation of the plurality of knowledge components is automatically established based on predefined rules. In one embodiment, the design process model is configured such that the knowledge components are addable, deletable and/or replaceable, the data relation and the execution relation of the knowledge components is modifiable, and the control data of the knowledge components is modifiable, so that the design process model is partially or fully executable. Further, the design process model is configured such that in operation, the human-computer interactive interfaces of the plurality of knowledge components are popped up in a predefined order according to the execution relation of the plurality of knowledge components so as to lead a designer to complete design and analysis work. In one embodiment, the data of the design process model is automatically modifiable in accordance with the predefined rules. In operation, modifying the data of the design process model triggers the design process model to be partially or fully executed, and the modifying process is repeated until optimized design results are obtained.

Additionally, the method also includes the step of integrating a variety of software platforms via an uniform environment so as to call the plurality of knowledge components of the design process model to perform an engineering design.

Furthermore, the method comprises the step of packing two or more knowledge components and the data relation and the execution relation thereof into a parent knowledge component without programming. The knowledge components packed in the parent knowledge component is replaceable when the parent knowledge component is called in an engineering design and analysis process.

The method further comprises the steps of establishing a database for storing having instructions, design regulations, design experiences and selected knowledge, and establishing a relationship between the plurality of knowledge components and the database so as to automatically display the associated knowledge when a knowledge component is used.

In another aspect, the present invention relates to a system of an engineering design. In one embodiment, the system has a knowledge packing module for constructing a plurality of knowledge components in a predefined form. Each knowledge component comprises one or more universal modules. Each universal module comprises at least operations, procedures, rules and flows of a corresponding engineering design process. In one embodiment, each universal module includes basic operations of file parsing, expression operations, command executions, script executions, CAD operations, CAE operations, database operations and report generations in a corresponding engineering design and analysis process. In one embodiment, each knowledge component is constructed to have a data interface having input and output ports, a control interface for defining a logical control relation between the knowledge component and the upstream and downstream knowledge components thereof, a human-computer interactive interface for managing data input and data output through the input and output ports of the data interface, a message interface for receiving the external message and information, and a third party tool interface for accessing a third party tool.

The system further have a human-computer interface module for defining a human-computer interactive interface for each knowledge component through which a user is able to control internal processes of the knowledge component, a data definition module for defining data input and output ports for each knowledge component, a data mapping definition module for defining a data mapping relation between the data input and output ports of the plurality of knowledge components, a flow definition module for defining a control logical relation for operations, procedures, rules and flows of each knowledge component, an execution and monitoring module for calling the plurality of knowledge components to perform an engineering design and monitoring the status of the engineering design, and a third party tool integration module for integrating third party tools at least with the execution and monitoring module to call the third party tools when performing the engineering design The system also has a knowledge component database for storing the plurality of knowledge components and a knowledge information database for storing instructions, design specifications and design experiences associated with the plurality of knowledge components.

In an alternative aspect, the present invention relates to an engineering design method based on a plurality of knowledge components. In one embodiment, the method includes a construction process of a plurality of knowledge components and a design process based on the plurality of knowledge components. The knowledge components is adapted for packing the universal module in the standard form. Accordingly, the knowledge components are independent from design layouts or design processes of products, and usable in different projects, time and platforms. The design process integrates a variety of software platforms via an uniform environment and calls the knowledge components to complete the engineering designs. The design process includes designing, modeling, analyzing and data processing.

In one embodiment, the design process defines the data relation and the execution relation between the knowledge components and establishes the relationship of the knowledge components, thereby forming the design process model without programming.

In one embodiment, the universal module comprises operations, methods, rules and/or flows of an engineering design process and engineering analysis process. The universal module may also include the file parsing, the expression operation, the command execution, the script execution, the CAD operation, the CAE operation, the database operation, the report generation and the other basic operations of the engineering design process and engineering analysis process.

In one embodiment, each knowledge component has data input/output ports and a human-computer interaction interface.

The construction process of the knowledge component further comprises: packaging a plurality of internal knowledge components and the data relation and the execution relation thereof into a parent knowledge components without programming. When calling the parent knowledge components in the design process, the knowledge components packed can be replaced.

The engineering method may also comprise the following process: establishing a database comprising instructions, design regulations, design experiences and other knowledge, and establishing the relationship between the knowledge components and the database. The associated knowledge may be automatically displayed when using the knowledge components.

When defining the data relation between the knowledge components in the design process, the data mapping relation between the ports of the knowledge components can be directly defined. In one embodiment, when calling the knowledge components, the data relation of the knowledge components may also be automatically established in accordance with the predefined rules.

The execution relation between the knowledge components may define the logical relation, the data driving relation, the time characteristics, the message trigging mechanism or one combination relation thereof in the execution of the knowledge components. When calling the knowledge components, the execution relation of the knowledge components may automatically generate in accordance with the predefined rules.

In the design process, the design process module may be packed into the knowledge components as the universal module.

The design process may lead the designers to complete the design analysis work in accordance with the scheduled steps through the execution of a knowledge component.

When the design modification is needed during the design process, the knowledge components in the design process model may be added, deleted and/or replaced, the data relation and the execution relation of the design process model may be modified, and the control data of the knowledge components of the design process model may also be modified and then the design process model may be partly or fully executed.

The control data of the design process model may be automatically modified in accordance with the predefined rules then the parts of and full design process model may be automatically executed, repeating like this until the needed design results are obtained.

In one embodiment, the method of the present invention comprises two steps: establishing the knowledge components and carrying out the design based on the knowledge components.

Through analyzing the operations, methods, rules and/or flows of the engineering design process and analysis process, one can classify them into a plurality of standard process, define the implementation methods, data interfaces and human-computer interfaces of these standard processes, and then packs these standard processes into the knowledge components in a standard form. The knowledge components are used for completing a certain work which may have data input/output ports and human-computer interaction interfaces. As the knowledge components pack the operation processes, the using methods, the design rules and the design flows of the design analysis tools, engineers/designers can input control data via the human-computer interfaces. The specific and fussy operations and the processing procedures may be completed by the knowledge components. Therefore, on one hand, it abates the workload of the designers thereby improving the work efficiency. On the other hand, the difficulty of using the tools is greatly reduced with no need of grasping the detailed operation details of the tools. Thus, the designers can focus more on the design itself. More importantly, the knowledge components realize the formalization of design and analysis knowledge thereby accumulates, shares and reuses the design and analysis knowledge in different design projects.

In one embodiment, the knowledge components are used to complete the design, modeling, analysis and data processing and other work of a variety links through a uniform environment. Meanwhile, the data relation and the execution relation of these knowledge components are defined to establish the relationship of these knowledge components without programming, thereby concurrently forming a design process model. The programming is not needed since each component has a standard form. The work style of defining data relation without programming greatly abates the traditional workload of manually connecting the data flow, and is convenient to carry out the connection of a variety of different ways, thereby achieving the high flexible modular design. Yet the execution relation of the knowledge components records a design course and a logic. Through the relation, the design analysis process can be replayed/redone. Alternatively, the association modification of the design data can be realized.

In one embodiment, the design process model is formed concurrently when selecting different knowledge components in accordance with the different products and dynamically defining the relationship in the design process without prefixing. Thus, it not only allows the extreme flexibility of the design process, but also realizes the traceability and repeatability in the design process.

In one embodiment of the present invention, basic and universal operation processes, such as the file parse, the expression operation, the command execution, the script execution, the CAD operation, the CAE operation, the database operation, the report generation, and so on in the engineering design analysis process are packed into one or more knowledge components, respectively. They constitute the component collection with the smallest granularity and complete functions in a variety of design analysis processes.

In another embodiment, a plurality of knowledge components, the data relation and execution relation thereof are packed into a parent knowledge component without programming. The parent knowledge component is adapted for performing complex design analysis functions. Because of no need of programming, a third party can also establish/create such knowledge components. When using the parent knowledge components, the internal knowledge components packed inside the parent knowledge component can be selectively replaced by the same type of the knowledge components and the internal data relation and the execution relation can be re-established through certain rules or a manual mode.

In yet another embodiment, a database having instructions, design regulations, design experiences and other knowledge is created, and the relationship between the knowledge components and database contents is established. When selecting the knowledge components, the operational human-computer interfaces, the data relation execution relation and the related knowledge can be automatically displayed.

In an alternative embodiment, in defining the data relation of the knowledge components, the data mapping relation between the data ports of the knowledge components is directly defined.

In a further embodiment, when using the knowledge components, the data relation between the knowledge components is automatically established on the basis of the predefined rules. For example, automatically establishes the data relation between the knowledge components on the basis of the rule that a data flow is formed under the circumstance of the coincidence of the name and the class.

In yet a further embodiment, the execution relation between the knowledge components defines the logical relation, the data driving relation, the time characteristics, the message trigging mechanism and any combination relation thereof in executing the knowledge components. The logical relation comprises a serial, a parallel and a branch relation, and specifies the logical conditions in the execution of the knowledge components. When the data relation exists between the knowledge components, the data conditions in the execution of the knowledge components can be defined through the data driving relation. For example, the knowledge components can not be executed until the upstream data changes. The time characteristics defines the time conditions of the execution of the knowledge components. The message trigging mechanism regulates the random event conditions in the execution of the knowledge components. When a certain random event occurs, the knowledge components receive the message of the event. This will be a necessary condition of starting execution. The four relations can be combined randomly to define the conditions of the starting execution of the knowledge components, and the logical relation thereof.

In one embodiment, when using the knowledge components, the execution relation of the knowledge components is automatically generated on the basis of the predefined rules. For example, the logical execution relation of a variety of types of knowledge components is predefined, when using the knowledge components, the execution relation with the other knowledge components is automatically established.

In another embodiment, after the establishment of the design process model via the knowledge components, the design process model can be published as a knowledge component, and the data input/output ports and human-computer interfaces of the knowledge components can be customized, thereby accumulating, managing and reusing the successful design process.

In a further embodiment, once the design process is successfully completed and the design process model is created, the design process model can be selected and executed again. This ensures the designers to gradually set the control parameters of all the links in accordance with the scheduled steps until complete the design and analysis work when carrying out the similar design. In this way, not only the work efficiency of the similar designs can be greatly improved, but also the difficulty of studying and developing the design work for beginners can be reduced, and the design process can be regulated by reusing the successful design process.

In yet a further embodiment, since the design process model is generated concurrently with the design process, when the design scheme is needed to be modified, the knowledge components of the design process model can be added, deleted or replaced, the data relation and the execution relation of the design process model can be modified, and the control data of the knowledge components of the design process model can also be modified. Accordingly, the design process model can be partially and fully executed to complete the design modification, thereby avoiding the large number of repeated work in the design modification process, and greatly improving the efficiency of the design modification and accelerating the design iteration process.

In an alternative embodiment, the control data of the knowledge components of the design process model is automatically modified by a certain of optimized algorithms in accordance with the predefined rules (e.g., in accordance with some output data in the design process model), and then partial of and full design process models is automatically executed. Repeating these processes until the required design results are obtained. This method ensures that the formed design process model can be used immediately to optimize the design after completing a design process.

Among other things, the method of present invention has the following technical advantages.

The traditional engineering design methods have the shortcomings of neglecting collecting, analyzing and reusing of the design methods. However, according the present invention, the prior design knowledge and experiences are effectively packed into the knowledge components, so that they can be standardized, shared and re-used in other similar design projects.

Additionally, in the traditional engineering design, a vast amount of design links/connections are connected manually. According to the present invention, the workload of the data flow process is greatly abated and the high flexible module design is realized through the standardization of the data ports and defining the data relation of the knowledge components without programming. Aiming at the problem of difficulty of traditional design modification and low efficiency of design iteration, the fast design modification and design iteration is realized through concurrently establishing the design process model and modifying and executing the design process model in the design process.

Aiming at the shortcomings of the lack of guidance and the poor regulation in the traditional design process, via reusing the design process model and the associated knowledge library, the design of the knowledge guidance is realized to improve the work efficiency, lower the threshold and regulate the design process.

Aiming at the problem of tools loosing, non-systematical and difficult of management in the design process at present, the use of tool becomes considerably convenient through the integrated design, the analysis and the data processing and other works in the uniform environments.

Aiming at the problem of the need of the special development expanding the function of a variety of tools at present, the method can customize and increase new knowledge components without programming thereby ensures the designers to expand functions voluntarily. Aiming at the shortcomings of not being suitable for the variable design processes of the integration technology at present, the present invention realizes the extreme flexibility of the design process through selecting different knowledge components in the design process and dynamically defining data relation and the execution relation without programming thereby can carry out the design of different types of products.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, wherein:

FIG. 9A is a human-computer interactive interface of two dimension skin knowledge components in the wing box design of the plane;

FIG. 9B is a human-computer interactive interface of two dimension wing spar knowledge components in the wing box design of the plane;

FIG. 11A is a human-computer interactive interface of three dimension skin knowledge components in the wing box design of the plane;

FIG. 11B is a human-computer interactive interface of three dimension wing spar knowledge components in the wing box design of the plane;

DETAILED DESCRIPTION OF THE INVENTION

Figure 1:
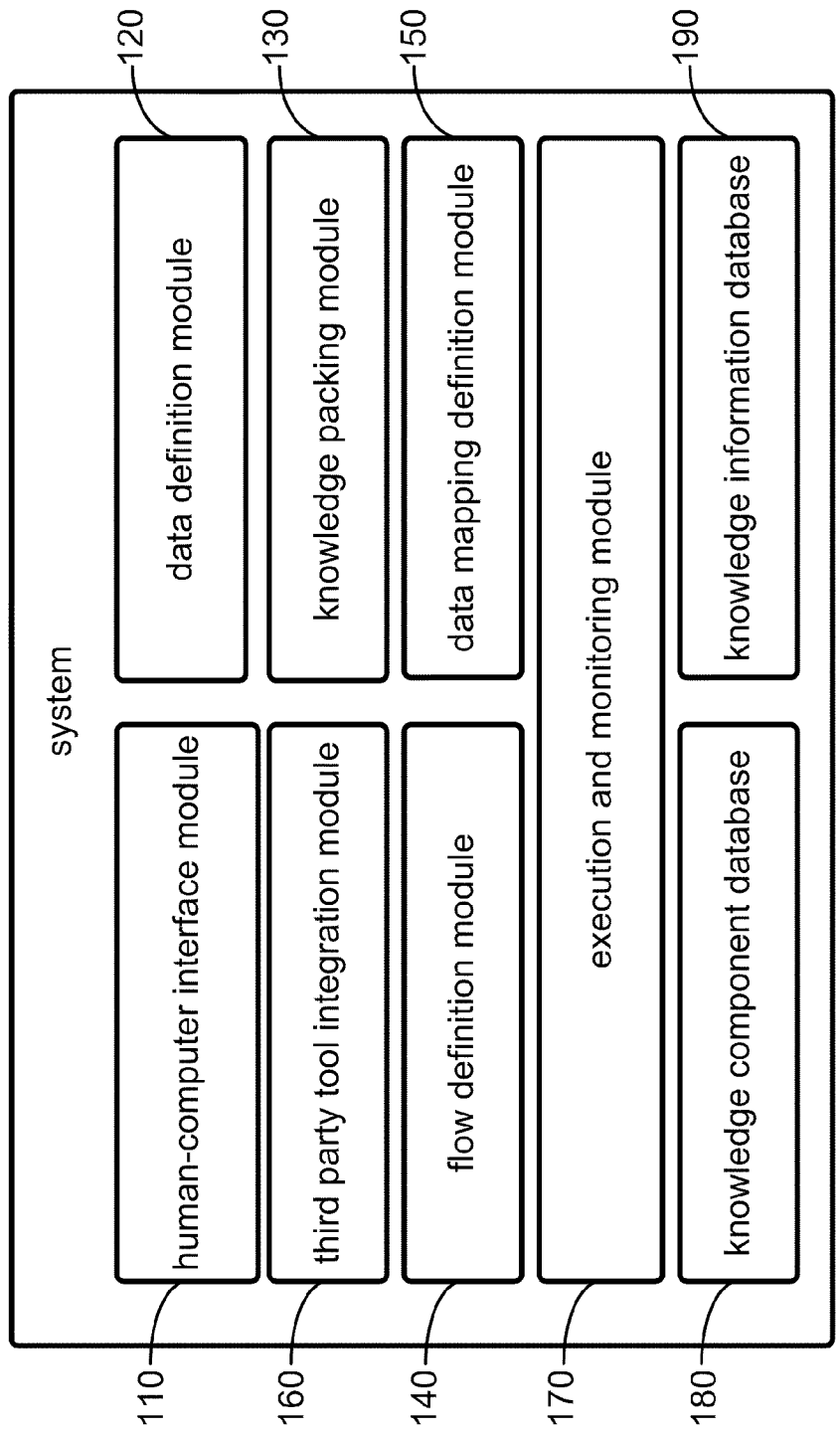
FIG. 1 shows schematically an integrated engineering design system according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The description will be made as to the embodiments of the present invention in conjunction with the accompanying drawings in FIGS. 1-14. In accordance with the purposes of this invention, as embodied and broadly described herein, this invention, in one aspect, relates to a method that utilizes knowledge components and data relations and an execution relations of the knowledge components to perform integrated engineering designs, and a system of implementing same.

Referring to FIG. 1, an integrated engineering design system 100 is shown according to one embodiment of the present invention. The system includes a human-computer interface module 110, a data definition module 120, a knowledge packing module 130, a flow definition module 140, a data mapping definition module 150, a third party tool integration module 160, an execution and monitoring module 170, a knowledge component database 180 and a knowledge information database 190.

In one embodiment, the data definition module 120 is used to define data input and outputs port of each knowledge component and all the related data collection.

The human-computer interface module 110 is adapted for defining one or more human-computer interactive interfaces of the knowledge components so as to ensures that users can control the internal process of the knowledge components through the interactive interfaced. Alternative, the human-computer interface module 110 is adapted for defining a human-computer interactive interface for each knowledge component. Through the human-computer interactive interface, users are able to control internal processes of the knowledge component.

The knowledge packing module 130 is adapted for packing the design methods, the design experiences and other knowledge, i.e., constructing a plurality of knowledge components in a predefined form. The predefined form can be a standard form. Each knowledge component packs one or more universal modules. Each universal module comprises at least operations, procedures, rules and flows of a corresponding engineering design process. In one embodiment, each universal module includes basic operations that include file parsing, expression operations, command executions, script executions, CAD operations, CAE operations, database operations, report generations and the like, in a corresponding engineering design and analysis process. Some of the basic operations and others are listed in Table 1.

The flow definition module 140 is used to define a control logical relation for operations, procedures, rules and flows of the knowledge components, the operations and the methods inside the knowledge components so as to form a design flow model.

The data mapping definition module 150 is adapted for defining the data mapping relation between the knowledge components, the operation and the method inside the knowledge components, i.e., defining a data mapping relation between the data input and output ports of the plurality of knowledge components.

The execution and monitoring module 170 is adapted for calling the plurality of knowledge components to perform an engineering design and monitoring the status of the engineering design.

The third party tool integration module 160 is adapted for integrating third party tools at least with the execution and monitoring module to call the third party tools when performing the engineering design. This is implemented in two integration processes. One is an external call process, by using the third party tool integration module 160, the system calls the third party tools through a command line or an access interface. The other is an internal embedded process, i.e., embedding the interface of the third party tools into the system to achieve human and computer interactive operations.

The knowledge component database 180 is used to store all the relevant data of the knowledge components, including the data input and output ports of the knowledge components, the human-computer interface data, the flow data and the data mapping relation, and so on.

The knowledge information database 190 stores the instructions, the design specifications, the design experiences and other information associated with the corresponding knowledge components.

Figure 2:
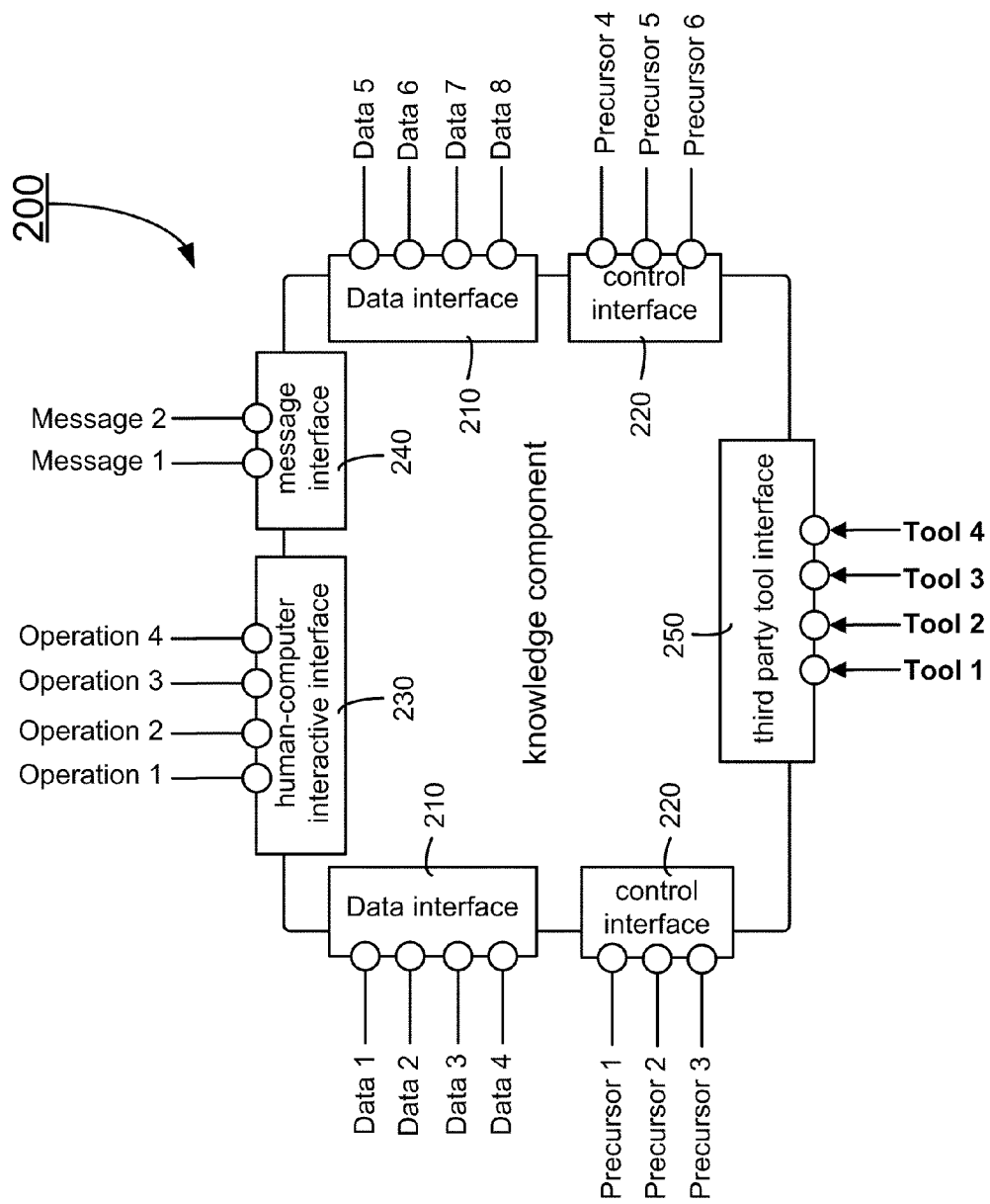
FIG. 2 shows schematically a knowledge component utilized in the system shown in FIG. 1.

FIG. 2 shows schematically a knowledge component 200 utilized in the system shown in FIG. 1. The knowledge component 200 includes a data interface 210, a control interface 220, a human-computer interactive interface 230, a message interface 240 and a third party tool interface 250. In one embodiment, the data interface 210 having data input and output ports is adapted for the data interaction of the knowledge component 200 with an external environment/data. The external data can be obtained through the data interface 210 of the knowledge component 200. The internal data of the knowledge component 200 can be transferred to the external environments. The control interface 220 is adapted for defining the logical control relation between the knowledge component 200 and the upstream and downstream knowledge components thereof, which are divided into a precursor control interface and a subsequence control interface. The precursor control interface is adapted for receiving the control information of the upstream knowledge components, while the subsequence control interface is adapted for sending the control information to the downstream knowledge components. The human-computer interactive interface 230 is adapted for managing data input and data output through the data input and output ports of the data interface. The message interface 240 is adapted for receiving external messages and information. The third party tool interface 250 provides the interface for accessing third party tools.

Some fundamental and universal operations of the engineering design and analysis process can be packed into the knowledge components used in the system shown in FIG. 1. The knowledge components constitute the components collection with the smallest granularity/unit and comprehensive functions which can complete the analysis process of a variety of equipments, as shown in Table 1.

TABLE 1

A list of basic knowledge components.

| Serial No. | Basic Knowledge Components | | Description |
|---|---|---|---|
| 1 | Mathematical functions | | pack a method in the form of mathematical formula |
| 2 | File parsing | | extract parameters from and/or write parameters into the files |
| | 2.1 | Text file | extract parameters from and/or write parameters into the text file |
| | 2.2 | Excel document | extract parameters from and/or write parameters into the Excel document |
| | 2.3 | Word document | extract parameters from and/or write parameters into the word document |
| 3 | Execution of command | | pack the executable procedure in the form of a command line |
| 4 | CAD operation | | pack operation procedures of CAD |
| | 4.1 | CAD model loading | load CAD model to an assembly component |
| | 4.2 | CAD parameter read-write | extract or revise the parameter in CAD model |
| | 4.3 | CAD parameter replacement | Replace parameters in CAD model |
| 5 | CAE operation | | pack operation procedures of CAE |
| | 5.1 | Meshing | generate a mesh model in accordance with the input model |
| | 5.2 | Material configuration | configure the material properties of an analyzed model |
| | 5.3 | Load configuration | configure the load properties of an analyzed model |
| | 5.4 | Boundary condition setting | configure the boundary condition of an analyzed model |
| | 5.5 | Solver calling | configure the solver for analysis |
| | 5.6 | Processing of the results | process the solving result |
| 6 | DLL (dynamic library) method calling | | pack a method in the form of the dynamic library |
| 7 | Data format transferring | | provide transfers between different data formats |
| 8 | Database | | provide the creation, inquiring, deletion, adding and other functions |
| 9 | Engineering algorithms | | provide packages of engineering algorithms, such as algorithms for optimization and approximation |
| 10 | Scripts (VBScript, JavaScript) | | pack scripts |
| 11 | Report generation | | provide generation method for all types of reports |

Since the knowledge components are formed in a standardized form, they can easily be combined into one another to implement complex functions in the system shown in FIG. 1. The combination includes establishing the data relation and the execution relation of the knowledge components with no need of programming.

Figure 3:
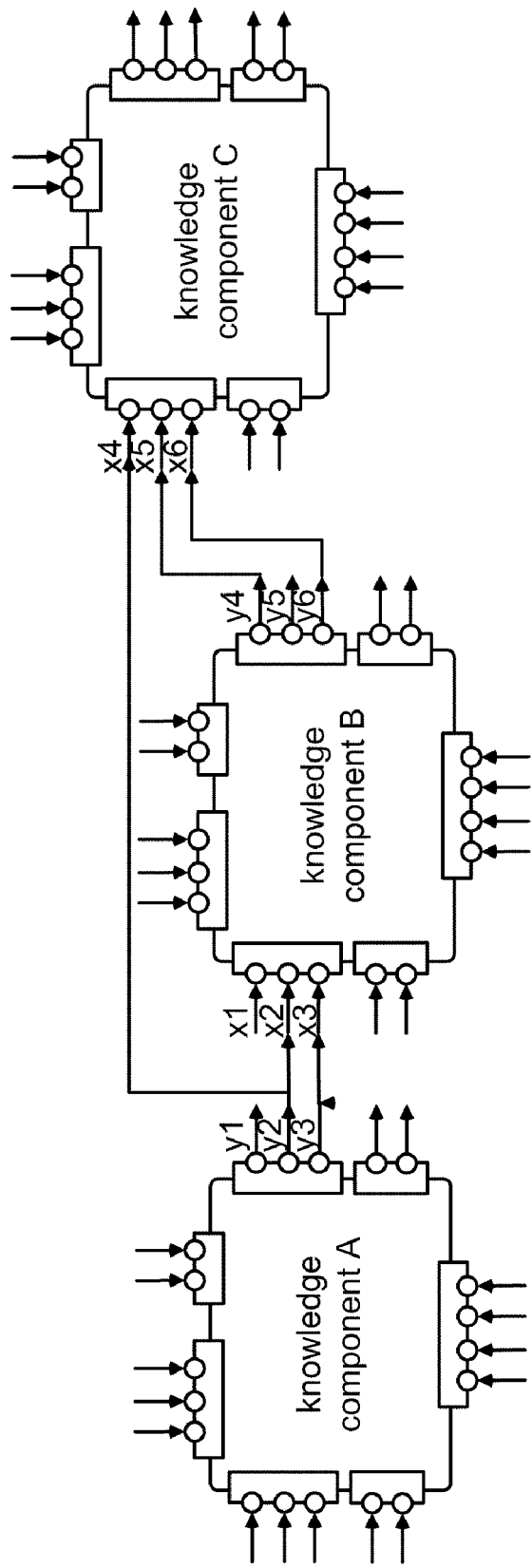
FIG. 3 shows schematically a data relation between knowledge components according to one embodiment of the present invention.

FIG. 3 illustrates schematically the data relation between the knowledge components according to one embodiment of the present invention. Because of the standardized data interfaces, the establishment of the data relation is represented by the data mapping relation between the data interfaces of the knowledge components. The mapping relation between the data interfaces can be established in the form of graphics, with no need of programming. As shown in FIG. 3, the data mapping between the parameters y2 and y3 of the knowledge components A and the parameters x2 and x3 of the knowledge component B, and the data mapping between the parameter y2 of the knowledge component A and the parameter x4 of the knowledge component C are established without programming, which forms the data flow relation between the knowledge components A, B and C. According to the present invention, there is no need of programming for establishing the data relations between the knowledge components, which not only greatly abates the workload of connecting the data flow, but also is convenient for a variety of connections of the knowledge components to realize the module design of high flexible. In the exemplary embodiment shown in FIG. 3, three knowledge components A, B and C are shown for the purpose of illustration only. It would be obvious to people skilled in the art that any number of the knowledge components can be utilized to practice the present invention.

In addition, the data relation between the knowledge components may automatically be established in accordance with the predefined rules. For example, for a system having a plurality of knowledge components, based on the names and types of the input parameters of a first knowledge component, the system can conduct a search in the remaining knowledge components to determine whether the names and types of the output parameters of one or more of the remaining knowledge components match the names and types of the input parameters of the first knowledge component. If so, the data mapping is automatically established between the first knowledge component and the one or more of the remaining knowledge components, thereby implementing the automatic establishment of the data relation between the first knowledge component and the one or more of the remaining knowledge components.

Figure 4:
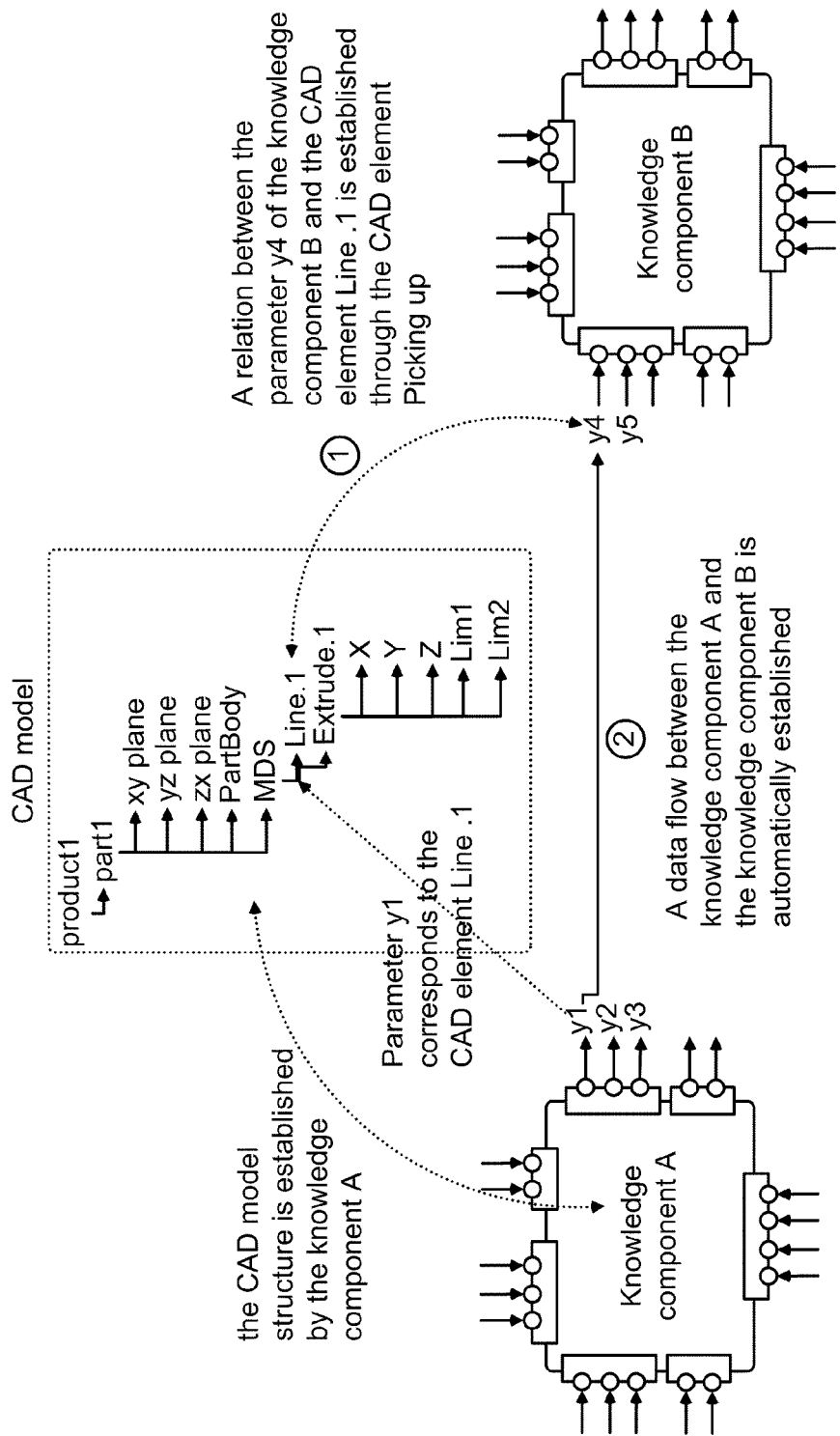
FIG. 4 shows schematically a data flow for automatically establishing a data relation (data mapping) between knowledge components A and B according to one embodiment of the present invention.
Figure 5:
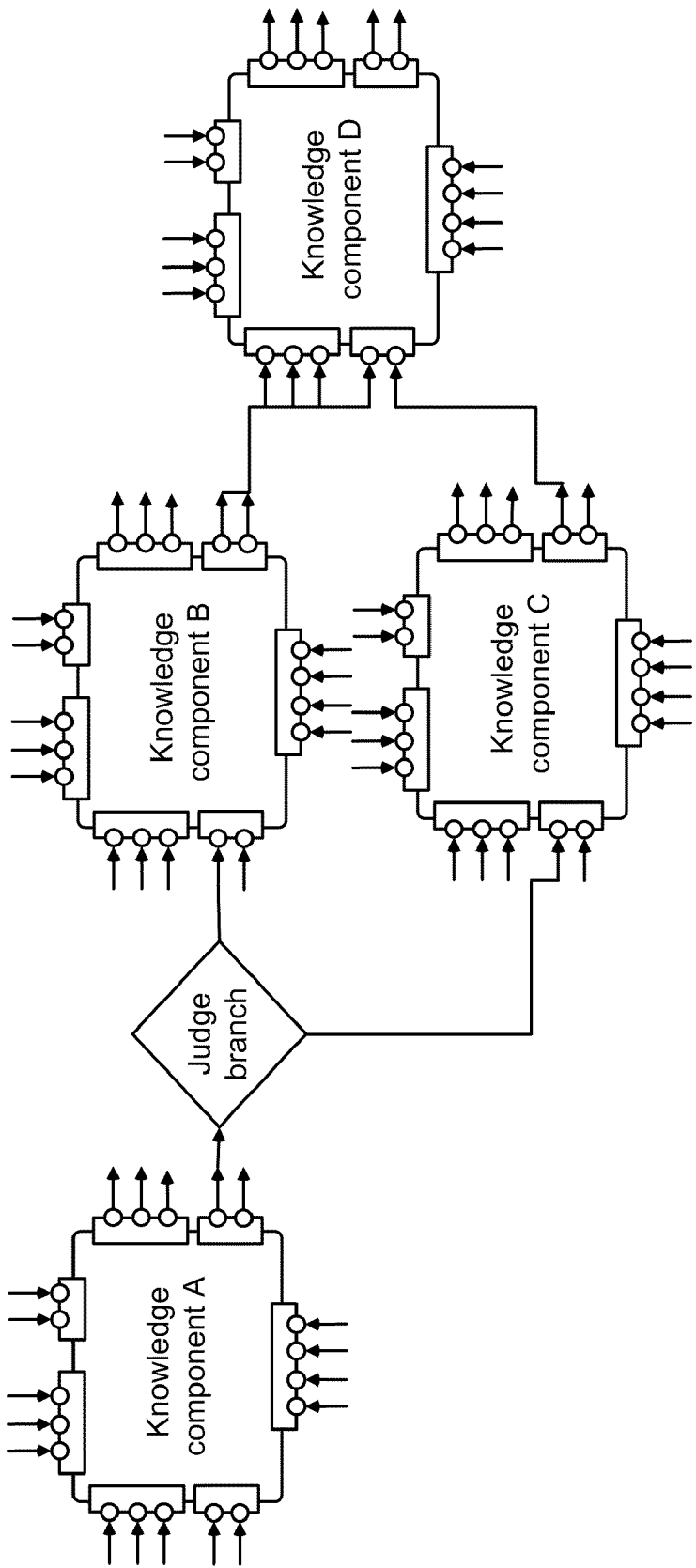
FIG. 5 shows schematically an execution relation between the knowledge components according to one embodiment of the present invention.

Referring to FIG. 4, a data flow for automatically establishing a data relation (data mapping) between knowledge components A and B is shown according to one embodiment of the present invention. In this example, the data mapping is automatically established if data entities corresponding to the two parameters are identical. In FIG. 5, the knowledge component A establishes a CAD model, the parameters y1 thereof is referred to 'Line.1' in the CAD model. The parameters y4 in the knowledge component B selects the element 'Line.1' in the CAD model through a pick-up operation. Since the two parameters are jointly referred to the same data entity (that is, the 'Line.1'), therefore, the data mapping of the parameters y1 and y4 is automatically established. Accordingly, the automatic establishment of the data relation between the knowledge components A and the knowledge components B is realized.

FIG. 5 shows schematically an established execution relation between the knowledge components without programming according to one embodiment of the present invention. The control flow of the knowledge components is established through the transferring line linking between the control interfaces of the knowledge components. The parallel, branch and iteration control logic is established through the parallel, branch and iteration control nodes.

Additionally, the control logical relation between the knowledge components can also automatically be established in accordance with the predefined rules. In one embodiment, assuming that the control logical relation of different types of the knowledge components is predefined, when using the knowledge components, the control logical relation of the knowledge components is automatically established based on the types of the knowledge components. In another embodiment, the control logical relation of the knowledge components is automatically established in accordance with the sequences that the users use the knowledge components to complete the engineering design, analysis task.

By applying the process as set forth above, one can select some knowledge components in the system of FIG. 1 and define a data relation and execution relation thereof, then pack the knowledge components and defined data relation and execution relation into a new knowledge component, called as a parent knowledge component, without programming.

Figure 6:
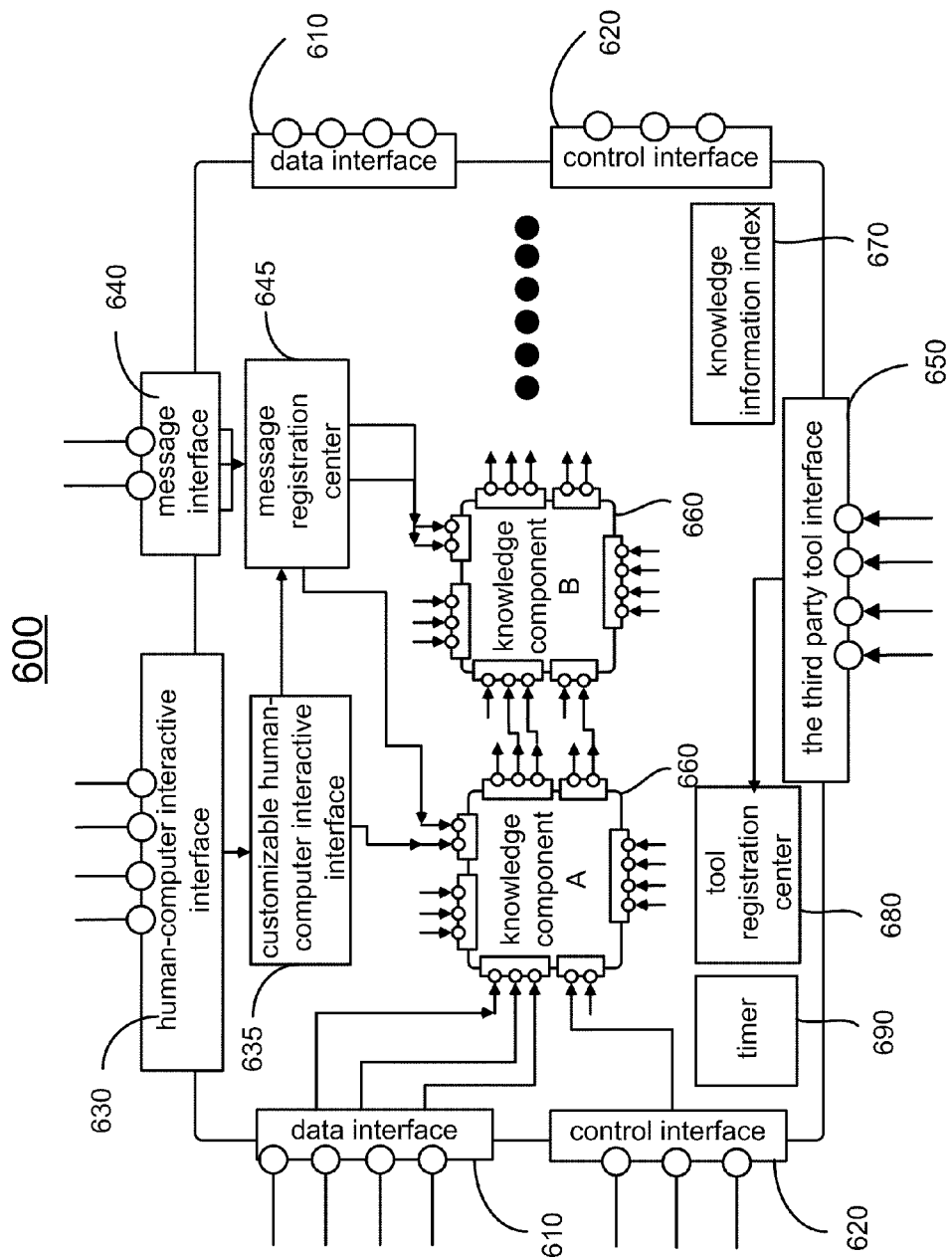
FIG. 6 shows schematically a parent knowledge component according to one embodiment of the present invention.
Figure 7:
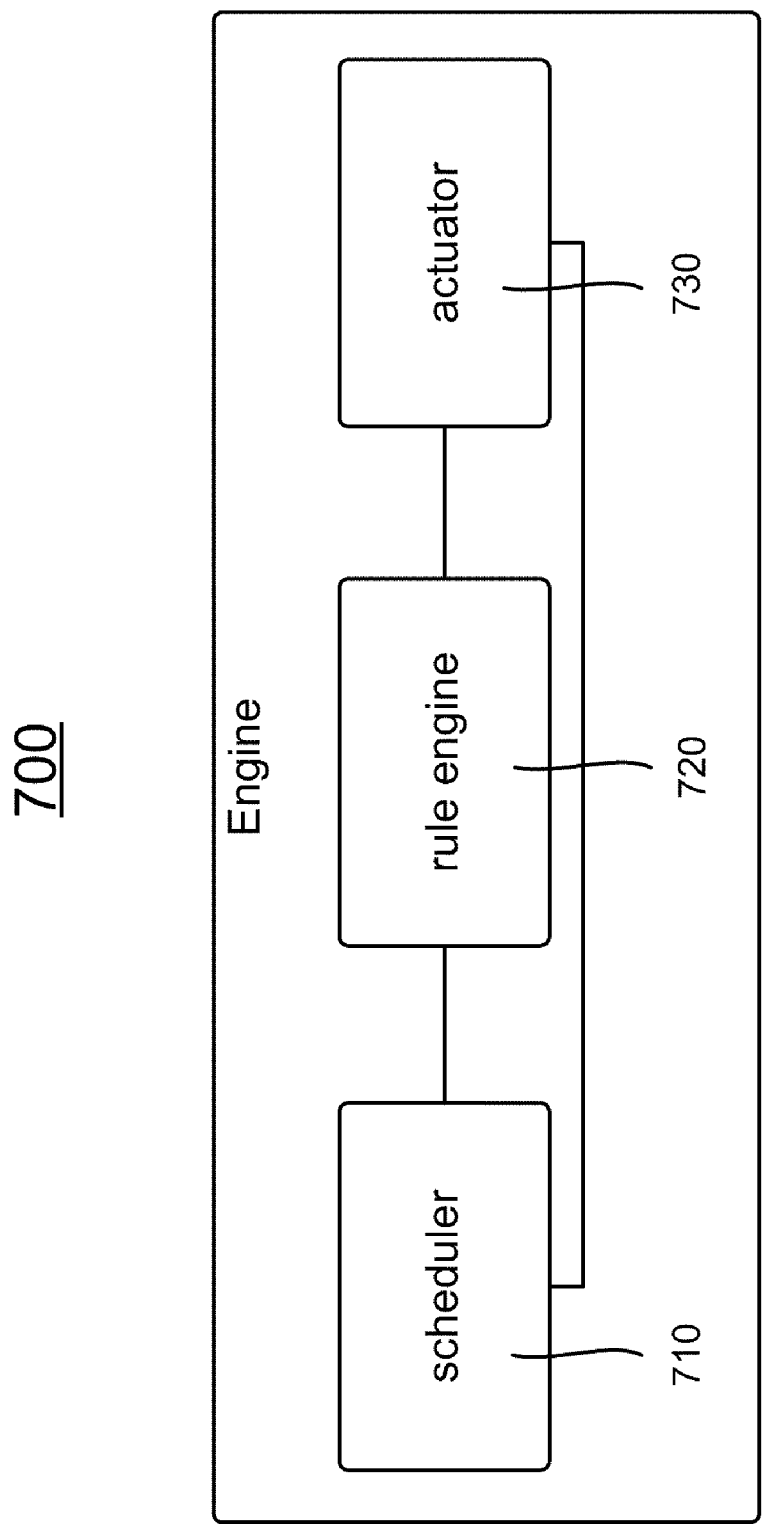
FIG. 7 shows schematically an execution engine according to one embodiment of the present invention.

In one embodiment, the internal structure of the parent knowledge component 600 is schematically shown in FIG. 6. The parent knowledge component 600 includes a data interface 610, a control interface 620, a human-computer interactive interface 630, a message interface 640, a third party tool interface 650, a message registration center 645, a knowledge information index 670, a tool registration center 680 a timer 690 and a plurality of knowledge components 660, which are configured to communicate with each other.

The human-computer interactive interface 630 includes a variety of types of human-computer interactive controls. The data control is used to expose the data of the parent knowledge component to users. The users may modify and check the data of the parent knowledge component 600 via the data control. The message control may bind a certain message in the message registration center. The users can trigger a message event via the message control.

The message registration center 645 is configured to establish and manage a variety of messages relating to the parent knowledge component 600, and send the messages to the internal knowledge components 660 which need to corresponds to these messages to trigger the correspondent activities.

The knowledge information index 670 is configured to record the index relations of a number of activities of the parent knowledge component 600 and the usage specification, the design instruction, the experience and knowledge and other information in the knowledge information database, and automatically extract the relevant information from the knowledge information database when the parent knowledge component 600 carry out a certain activity.

The timer 690 is configured to send the time message to the message registration center 645 on the basis of the time point set by the parent knowledge component 600.

The tool registration center 680 is configured to record information of the third party tool connected into the parent knowledge component 600. The information includes the access interface, the data interface, the starting mechanism of the third party tool.

The plurality of knowledge components 660 is connected to each other through the data flow and the control flow to form a design process model.

The execution relation of the design process model in FIG. 6 may include a logical drive, a data drive, a time drive and a message drive.

The logical drive defines logical conditions in the execution of the knowledge components and is established via the transferring line and control logical node of the control interface of the knowledge components. Meeting the logical conditions means all the knowledge components connected with the precursor control interface of the knowledge components have completed operation.

The data drive defines data conditions in the execution of the knowledge components. For example, the knowledge components can not be executed until the upstream data changes. The data drive relation is established via a mapping line between the data interface of the knowledge components.

The time drive defines time conditions in the execution of the knowledge components. The present time is determined via the timer and is compared with the start time set by the knowledge components, if the start time is achieved, the time drive conditions is met.

The message drive regulates random events condition in the execution of the knowledge components. When a certain random event occurs, the message of the event is received by the knowledge components via the message interface thereby meets the message trig condition.

The four drive conditions can be randomly combined, the starting execution conditions of the knowledge components can be defined and the logical relation between the conditions, such as 'and' and 'or' and other logical relations, may be set.

When the parent knowledge component illustrated in FIG. 6 is used, the internal knowledge components can be regarded as a 'black box'. Therefore, the internal knowledge components are replaceable by the same types of knowledge components without changing the execution relation. In the replacement, if the data interfaces of the internal knowledge components and the replacement of knowledge components are compatible to each other, the original data relation remains unchanged. Otherwise, the data relation needs being adjusted.

The knowledge information index 670 of the parent knowledge component 600 of FIG. 6 can be associated with a knowledge information in the knowledge database. The knowledge information includes a name, a key word searching, a specialty, a problem description, a design regulation, a reference experience, a parameters experience value, a principle, and so on. When selecting the knowledge components, the relevant knowledge information can be extracted from the knowledge database via the knowledge information index and is automatically presented to the users, thereby assisting the users to use the knowledge components effectively.

The above discloses the procedures and method for creating the knowledge components utilized in the system of the present invention. The procedures and methods of using the knowledge components are as follows.

When designing and analyzing a system, the knowledge components are selected from the knowledge components database to create an example. The knowledge components in the created example are loaded and executed via an execution engine. The structure of the execution engine 700 is schematically shown FIG. 7, and includes a scheduler 710, a rule engine 720 and an actuator 730. The scheduler 710 is adapted for providing the knowledge components for the rule engine 700, i.e., the scheduler 710 schedules the running subsequence component of the knowledge components in the actuator 730 into the engine 700 in accordance with the defined data flow, the control flow, and schedules the knowledge components meeting the time conditions and the message trigger conditions into the engine 700, then sends to the rule engine 720 via an arrangement. The rule engine 720 determines whether or not the knowledge component is executable. In doing so, the rule engine 720 first obtains the combination of the logical expression of the data, the control, the time and the message that decides the start conditions of the knowledge components, and then calculates whether or not the logical expression is true. If the logical expression is true, the knowledge components operate, otherwise, the knowledge components continue to wait. The actuator 730 receives the knowledge components from the rule engine 720 and calls the corresponding execution method in accordance with the types of the knowledge components.

By applying the above process, a variety of links/connections of the knowledge components is completed via repeatedly calling the knowledge components. Meanwhile, the data relation and the execution relation between the knowledge components are dynamically established without programming so as to establish a design process model. In one embodiment, the design process model is packed into a new knowledge component, and defines data interfaces and human-computer interactive interfaces thereof. Accordingly, the design process can be standardized, shared and/or reused.

According to the present invention, the design process model is created dynamically and concurrently with the design process, which is different from the traditional design method that defines first a flow, then executes the flow to finish the design. Therefore, the invented design process model is suitable for the flexible and variable design process. Once the design process is completed, the successful design process model is saved for re-use in the same types of designs. For example, when encountering the same problem again, the designers can complete the design and analysis process in accordance with the scheduled steps through the execution of the process design model. Thus, according the present invention, the design efficiency can greatly be improved and the design cost can be reduced. Furthermore, the design process is standardized.

Because the design process model is concurrently created with the process of using the knowledge components to design, it represents the design process faithfully. Therefore, when design changes need, the design changes can be implemented by adding, deleting and/or replacing the knowledge components of the design process model, or by modifying the data relation and the execution relation of the design process model, or by modifying the control data of the knowledge components of the design process model. The design process redo, thus design changes, is implemented by partially or completely executing the design process model.

In the process of using the knowledge components to design, the design process model is also used to optimize the design. The control flow relation and the data flow relation are recorded in the design process model. The execution engine automatically drives the knowledge components to automatically execute in accordance with the reasonable order, thereby constituting the preconditions of optimization. In one embodiment, the optimization of a design includes the following steps:

Step 1: selecting the input data of the design process model as optimized design variables.

Step 2: selecting the output data of the design process model as the optimized design objectives.

Step 3: selecting the output data of the design process model as the optimized constraint conditions and setting the constraint value range.

Step 4: selecting specific optimized algorithms.

Step 5: obtaining the value of the design variables of the optimizer and assigning the input parameters of the corresponding design process.

Step 6: the execution engine drives the design process to execute automatically.

Step 7: obtaining the output parameters of the design process, assigning the design objectives and designing the constraint of the optimizer.

Step 8: determining whether or not the optimization is convergent, if not, automatically changing the value of the design variables and going to step 5.

Step 9: outputting the optimized design scheme.

One aspect of present invention provides a method of an engineering design. In one embodiment, the method includes the step of constructing a plurality of knowledge components in a predefined/standard form. Each knowledge component comprises one or more universal modules. Each universal module comprises least operations, procedures, rules and flows of a corresponding engineering design process. In one embodiment, each universal module includes basic operations, such as file parsing, expression operations, command executions, script executions, CAD operations, CAE operations, database operations, report generations and the like in a corresponding engineering design and analysis process. Referring back to FIG. 2, each knowledge component is constructed to have a data interface 210 having input and output ports, a control interface 220 for defining a logical control relation between the knowledge component and the upstream and downstream knowledge components thereof, a human-computer interactive interface 230 for managing data input and data output through the input and output ports of the data interface, a message interface 240 for receiving the external message and information, and a third party tool interface 250 for accessing a third party tool.

The method further comprises the step of defining a data relation and an execution relation of the plurality of knowledge components so as to correlate the plurality of the knowledge components to each other to form a design process model without programming. The execution relation of the plurality of knowledge components comprises logical relations, data driving relations, time characteristics, message trigging mechanisms and any combination thereof. In one embodiment, when defining the data relation of the plurality of knowledge components, a data mapping relation between the input and output ports of the plurality of knowledge components is directly defined. When calling the plurality of knowledge components, the data relation and the execution relation of the plurality of knowledge components is automatically established based on predefined rules. In one embodiment, the design process model is configured such that the knowledge components are addable, deletable and/or replaceable, the data relation and the execution relation of the knowledge components is modifiable, and the control data of the knowledge components is modifiable, so that the design process model is partially or fully executable. Further, the design process model is configured such that in operation, the human-computer interactive interfaces of the plurality of knowledge components are popped up in a predefined order according to the execution relation of the plurality of knowledge components so as to lead a designer to complete design and analysis work. In one embodiment, the data of the design process model is automatically modifiable in accordance with the predefined rules. In operation, modifying the data of the design process model triggers the design process model to be partially or fully executed, and the modifying process is repeated until optimized design results are obtained.

Additionally, the method also includes the step of integrating a variety of software platforms via an uniform environment so as to call the plurality of knowledge components of the design process model to perform an engineering design.

Furthermore, the method comprises the step of packing two or more knowledge components and the data relation and the execution relation thereof into a parent knowledge component without programming. The knowledge components packed in the parent knowledge component is replaceable when the parent knowledge component is called in an engineering design and analysis process.

The method may also includes the steps of establishing a database for storing having instructions, design regulations, design experiences and selected knowledge, and establishing a relationship between the plurality of knowledge components and the database so as to automatically display the associated knowledge when a knowledge component is used.

Without intent to limit the scope of the invention, additional exemplary embodiment of the present invention, e.g., a detailed engineering design of a wing box of a plane, is given below.

The structure design of the wing box of the plane includes a plurality of specialties which needs using a plurality of design, analysis tools, the design process is very complex, the design period is surely be delayed once problems occurs in a certain link thereby affecting the completion of the design task. According to the present invention, the design and the analysis of the wing box structure of the plane can be rapidly completed via using the knowledge components.

Figure 8:
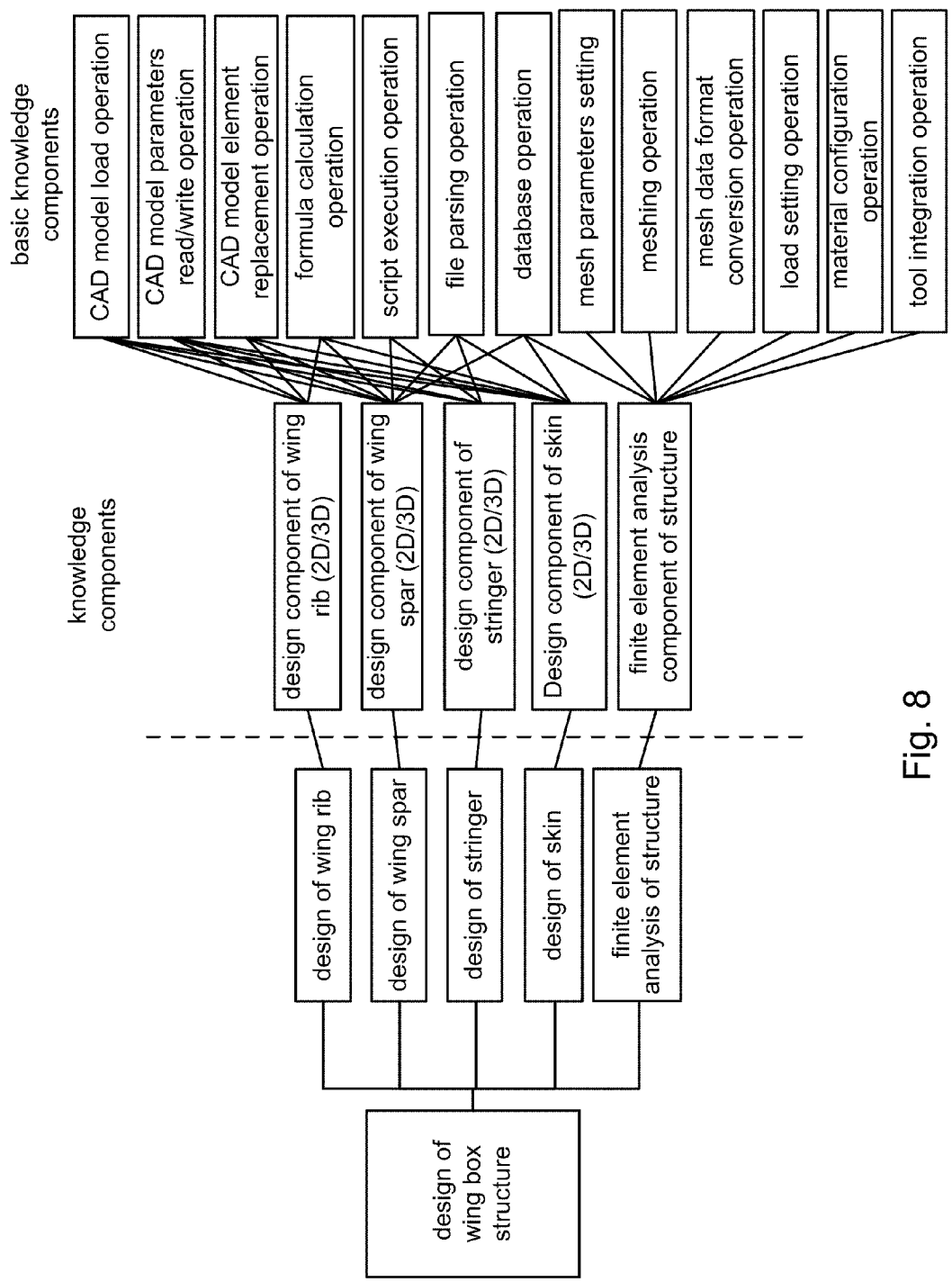
FIG. 8 shows schematically knowledge components and processes in a design and the analysis of a wing box structure of a plane.

FIG. 8 shows schematically the knowledge components and processes in the design and the analysis of the wing box structure of the plane. The design of the wing box structure of the plane is divided into a wing rib design, a wing spar design, a stringer design, a skin design, and a finite element analysis of structures, which needs a CAD modeling, a CAD parameters read/write, a CAD characteristic elements replacement, a surface modeling, a coordinate transformation and the other design operations, respectively. The analysis of the wing box structure of the plane needs the finite element calculation of structures, needs a meshing, loading, a material selection, a solving and the other steps. Through different packing methods, these operations and steps are packed into knowledge components, thereby constitutes the collection of the specialty knowledge components of the design and the analysis of the wing box structure of the plane.

The design process of the wing box structure of the plane includes two parts: the structure design and the structure analysis.

The structure design part includes designing and modeling of ten wing ribs, two wing spars, ten stringers, four short beams, two skins. This needs to use four classes of two dimension layout knowledge components, four classes of three dimension structure knowledge components to construct. The structure design model is dynamically established in the process of using the structure design knowledge components to design.

Figures 9A, 9B:
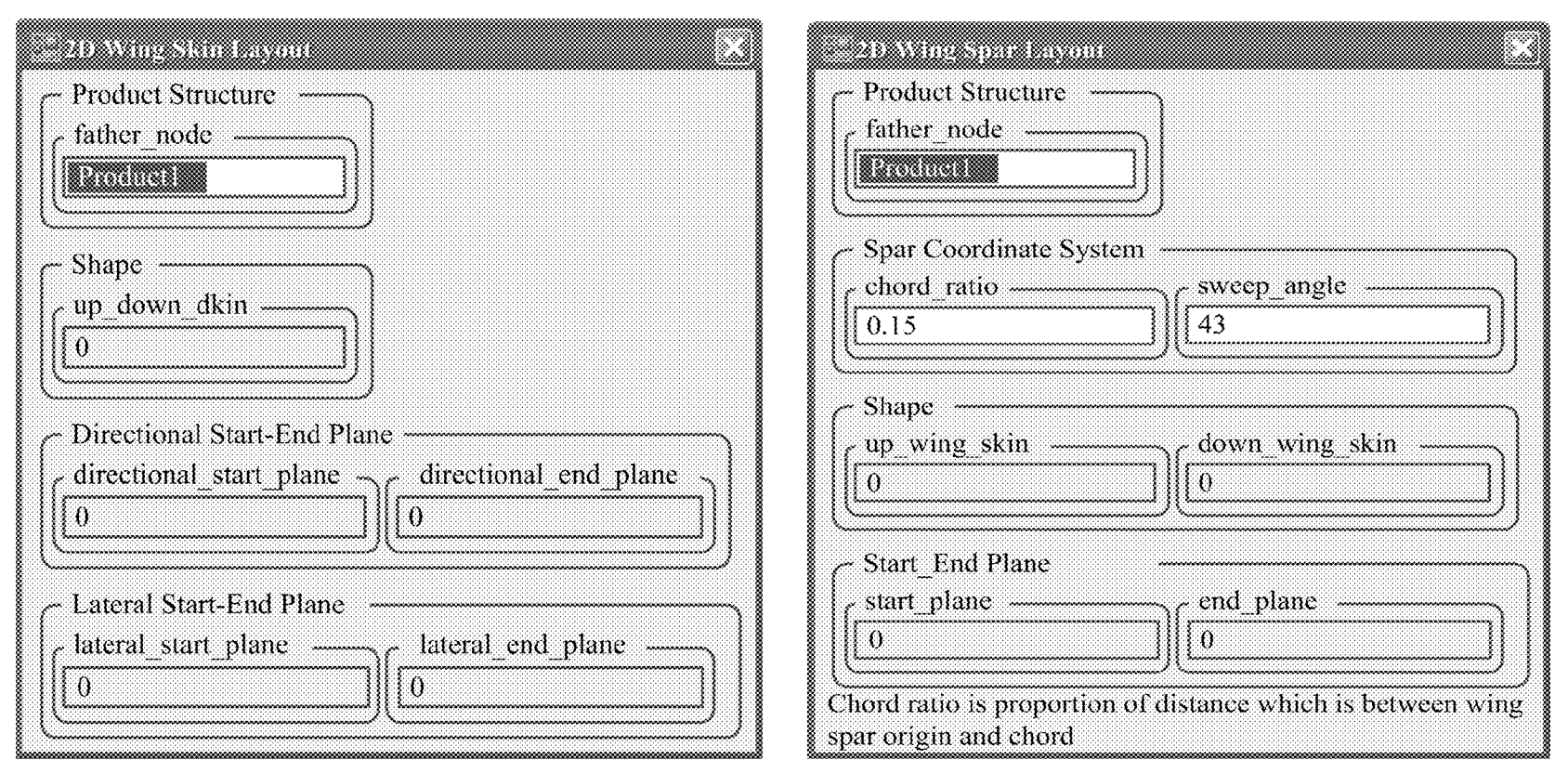
Figure 9D:
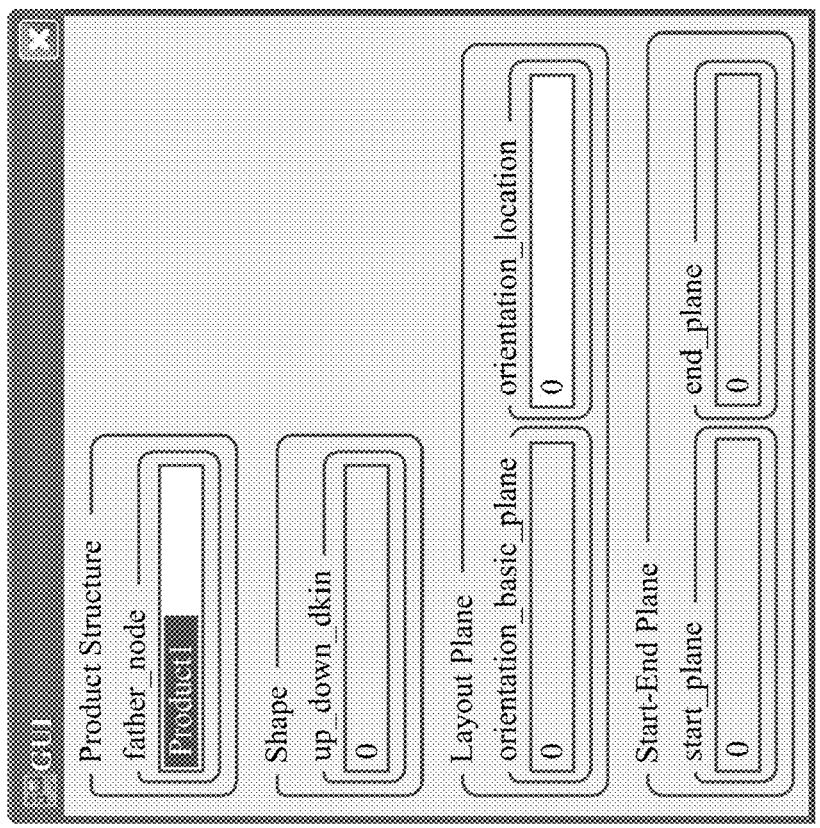
FIG. 9D is a human-computer interactive interface of two dimension stringer knowledge components in the wing box design of the plane.
Figure 9C:
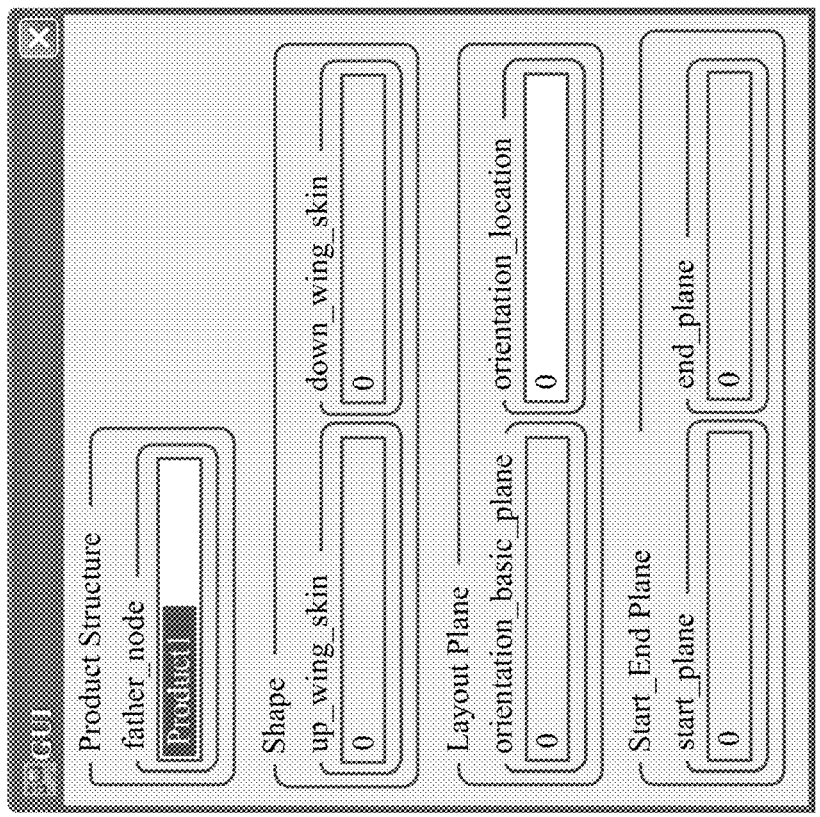
FIG. 9C is a human-computer interactive interface of two dimension wing rib knowledge components in the wing box design of the plane.

FIGS. 9A-9D are the human-computer interactive interfaces of two dimension arrangement knowledge components. FIG. 9A is the human-computer interactive interface of two dimension skin knowledge components. FIG. 9B is the human-computer interactive interface of two dimension wing spar knowledge components. FIG. 9C is the human-computer interactive interface of two dimension wing rib knowledge components. FIG. 9D is the human-computer interactive interface of two dimension stringer knowledge components.

Figure 10:
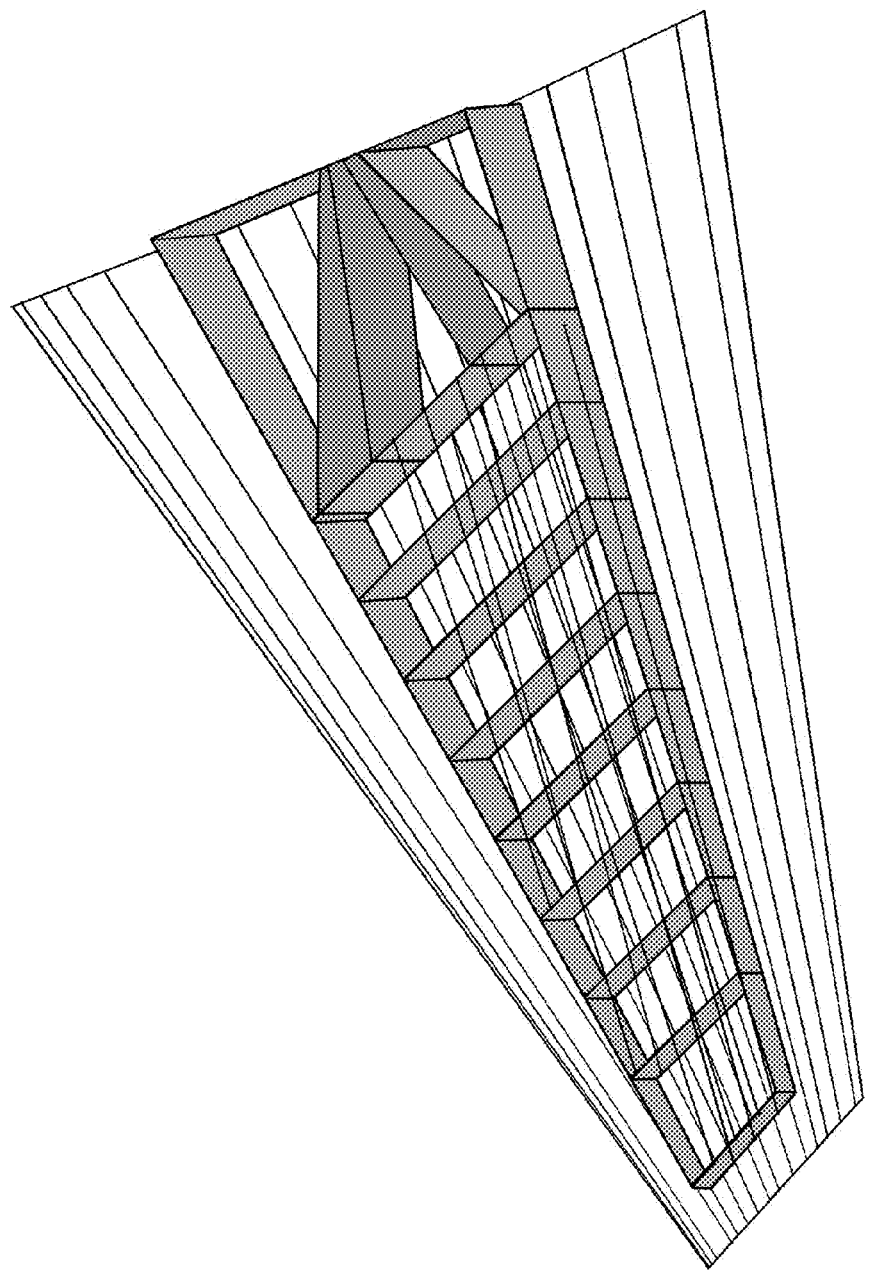
FIG. 10 is a structure layout model using the two dimension layout knowledge components in the wing box design of the plane.

FIG. 10 is the structure layout model using the two dimension layout knowledge components to establish.

Figures 11A, 11B:
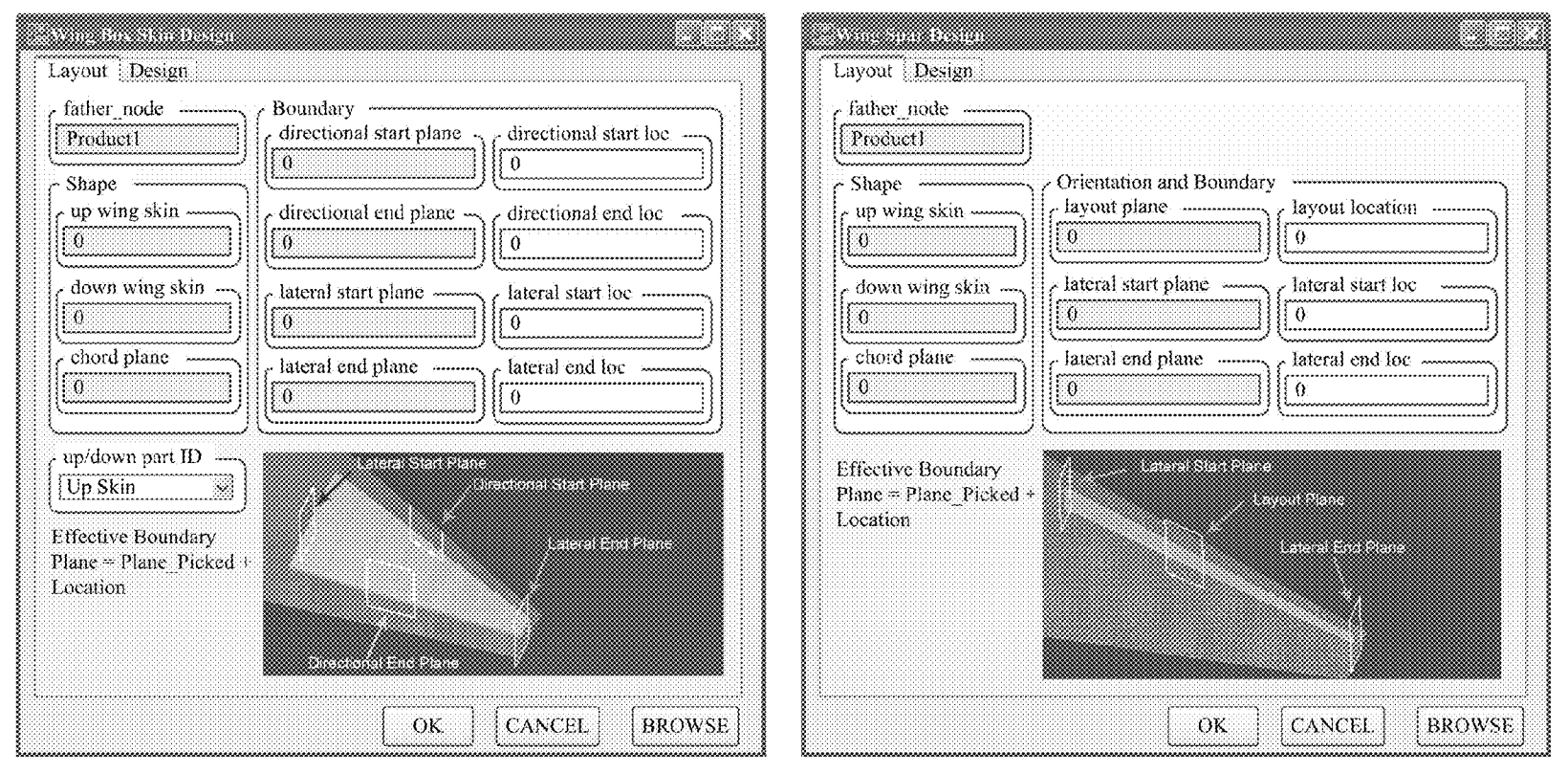
Figure 11D:
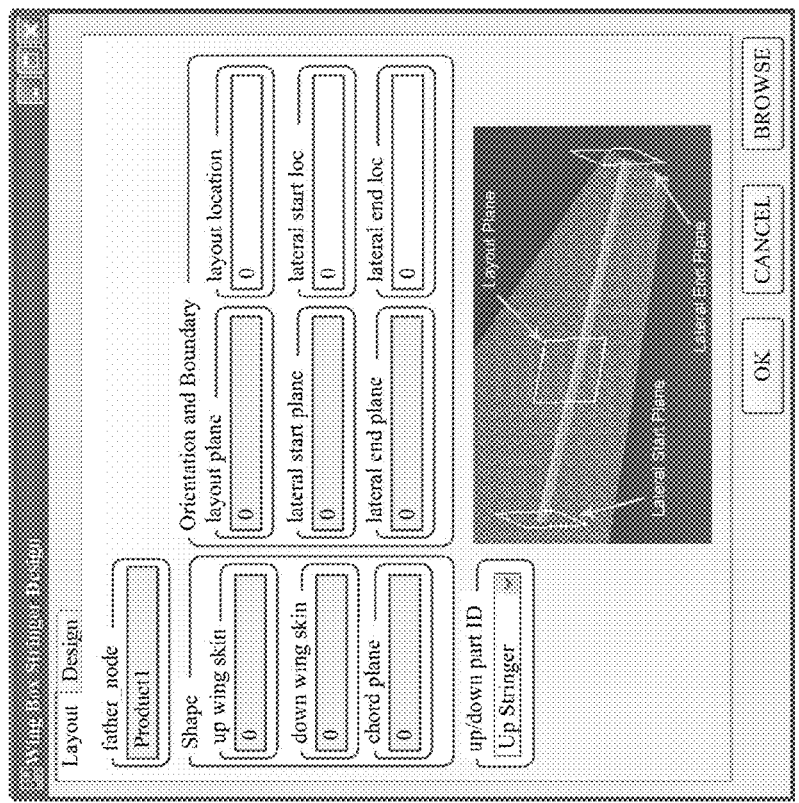
FIG. 11D is a human-computer interactive interface of three dimension stringer knowledge components in the wing box design of the plane.
Figure 11C:
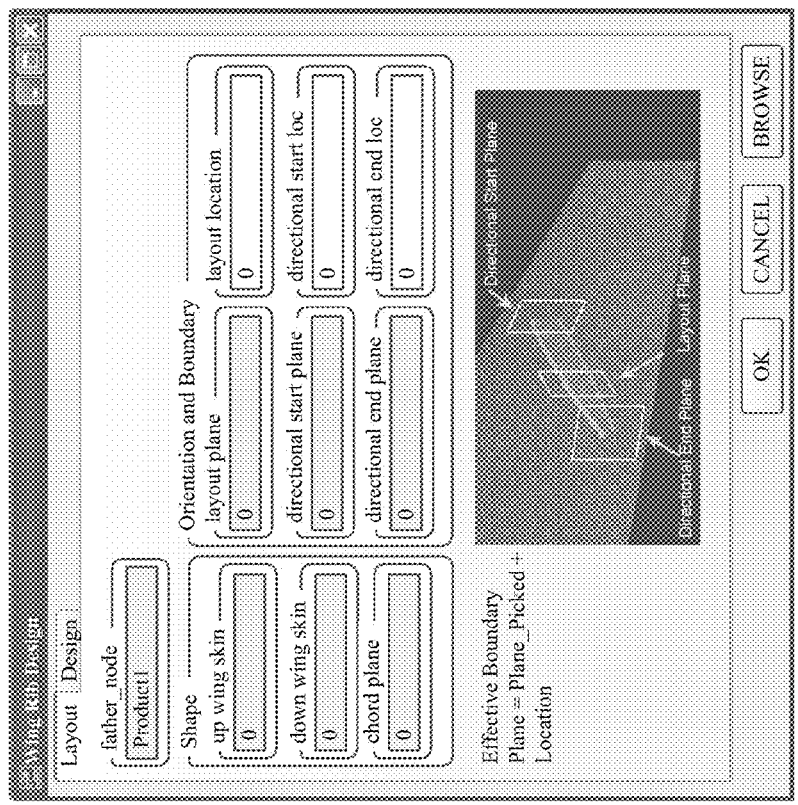
FIG. 11C is a human-computer interactive interface of three dimension wing rib knowledge components in the wing box design of the plane.

FIGS. 11A-11D are the human-computer interactive interfaces of three dimension structure knowledge components. FIG. 11A is the human-computer interactive interface of three dimension skin knowledge components. FIG. 11B is the human-computer interactive interface of three dimension wing spar knowledge components. FIG. 11C is the human-computer interactive interface of three dimension wing rib knowledge components. FIG. 11D is the human-computer interactive interface of three dimension stringer knowledge components.

Figure 12:
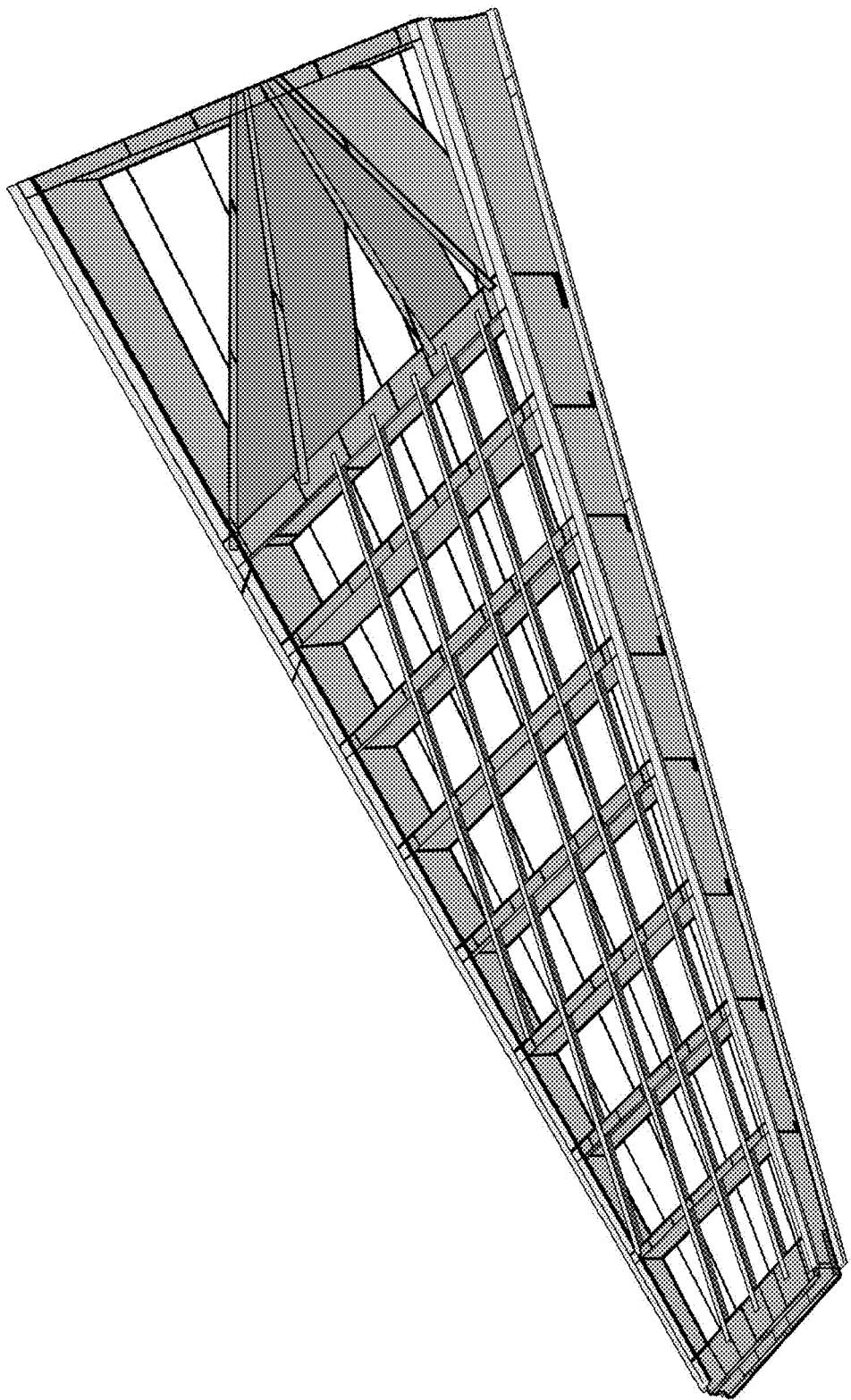
FIG. 12 is a structural three dimension model established by the three dimension structural knowledge components in the wing box design of the plane.

FIG. 12 is the structural three dimension model established by the three dimension structural knowledge components.

Figure 13:
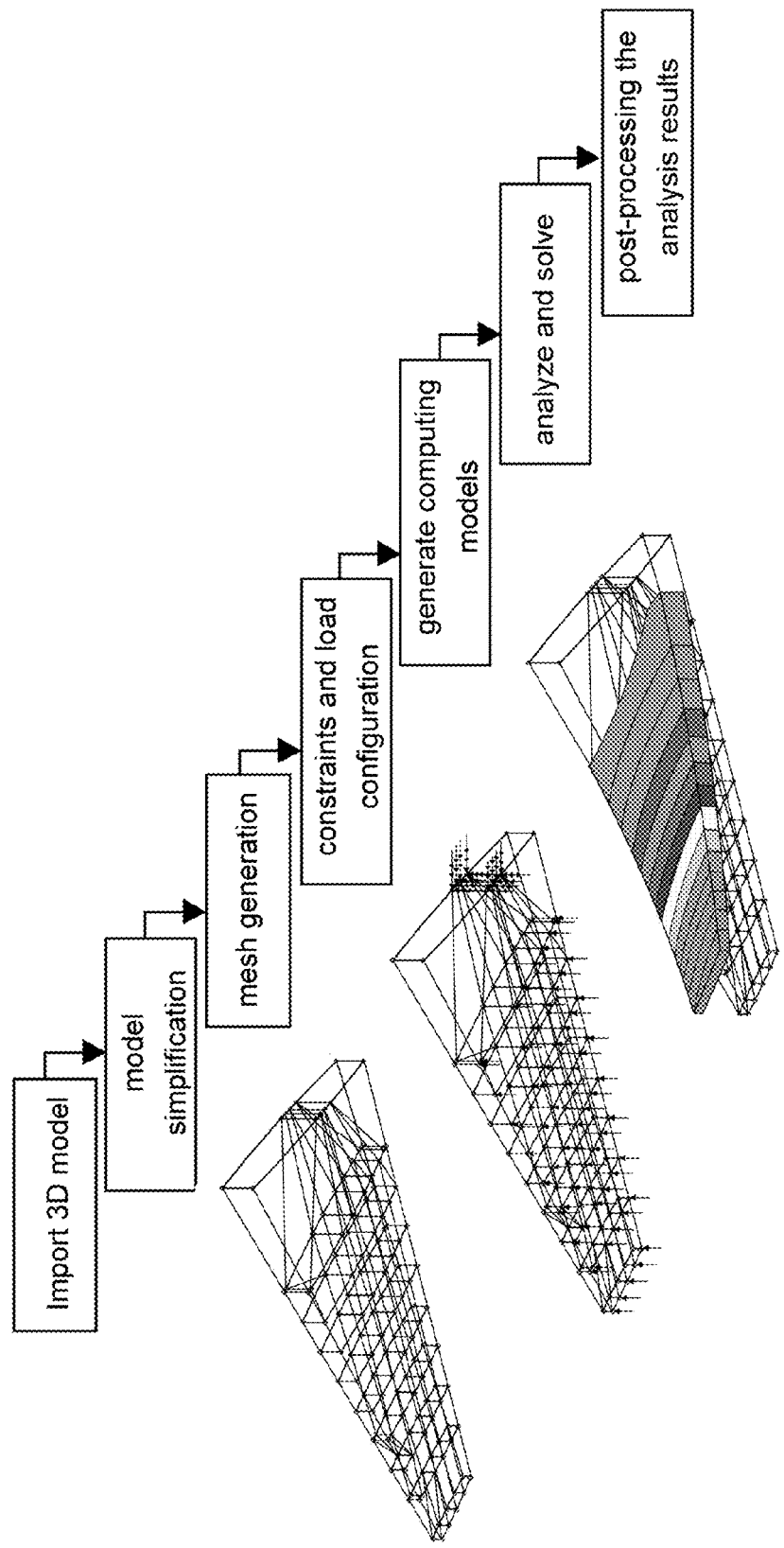
FIG. 13 shows a strength analysis process in the wing box design of the plane.

The structure analysis is to analyze and calculate the strength of the wing box through calling the finite element analysis knowledge components on the basis of completing the structure design. The strength analysis is a relative fixed process, as shown in FIG. 13, and thus may reuse the prior strength analysis process model to lead the engineers to complete the strength analysis via guidance methods.

Figure 14:
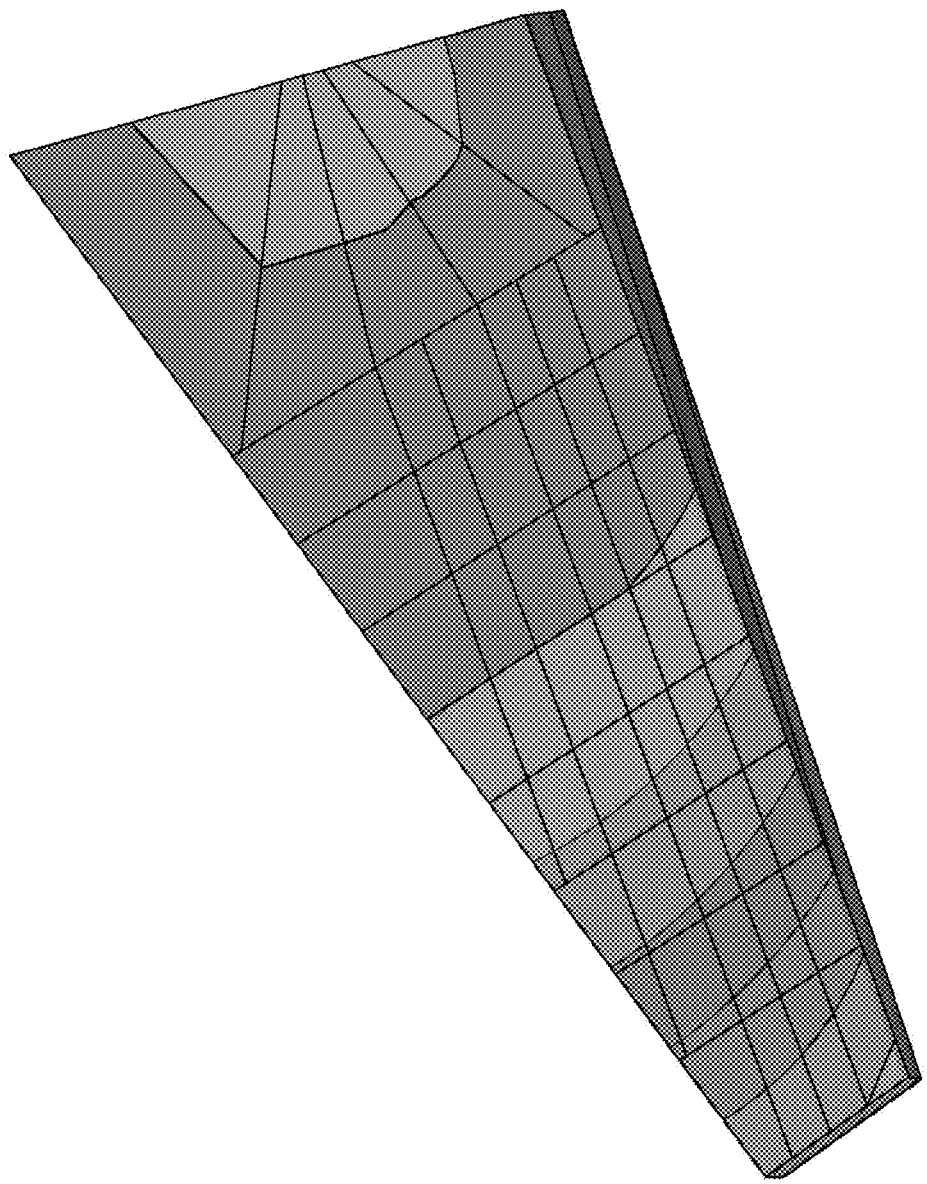
FIG. 14 is a strength distribution cloud chart in the wing box design of the plane.

FIG. 14 is the strength distribution cloud chart generated by reusing the prior strength analysis process model to carry out the strength analysis of wing box.

The present invention, among other things, recites an engineering design method and a system of implementing same. In one embodiment, the method includes a construction process of knowledge components and a design process based on the knowledge components. The knowledge components pack universal modules in the predefined or standard forms. Accordingly, the knowledge components are independent from design layouts or design processes of products, and usable in different projects, time and platforms. The design process integrates a variety of software platforms via an uniform environment and calls the knowledge components to complete the engineering designs. Further, the design process defines a data relation and an execution relation of the knowledge components and establishes a relationship of the knowledge components without programming. The universal module comprises at least operations, methods/procedures, rules, flows and/or the like of an engineering design process and engineering analysis process. According to the present invention, the engineering design process can be dynamically optimized, modified, executed and reused through the integrated application of the knowledge components, thereby improving the efficiency of the engineering design.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of an engineering design, comprising the steps of:
   (a) constructing a plurality of knowledge components, wherein each knowledge component comprises one or more universal modules, each universal module comprising at least operations, procedures, rules and flows of a corresponding engineering design process, wherein each knowledge component is constructed to have:
      (i) a data interface having data input and output ports;
      (ii) a control interface having input and output ports, for defining a logical control relation between the knowledge component and its upstream and downstream knowledge components thereof;
      (iii) a human-computer interactive interface having input ports, for managing data input and data output through the data input and output ports of the data interface;
      (iv) a message interface having input ports, for receiving external messages and information; and
      (v) a third party tool interface having input ports, for accessing third party tools,
      wherein the logical control relation is automatically established in accordance with the sequences that a user uses the knowledge components to complete the engineering design process;
   (b) defining a data relation and an execution relation of the plurality of knowledge components so as to correlate the plurality of the knowledge components to each other to form a design process model dynamically and concurrently with the design process without programming, wherein when defining the data relation of the plurality of knowledge components, a data mapping relation between the input and output ports of the plurality of knowledge components is automatically established, wherein the execution relation of the plurality of knowledge components comprises logical relations, data driving relations, time characteristics, message triggering mechanisms and any combination thereof, and wherein data of the design process model is automatically modifiable by a computer that is operatively associated with the plurality of knowledge components, in accordance with the rules adapted for defining the design process model;
   (c) integrating a variety of software platforms via an uniform environment so as to call the plurality of knowledge components of the design process model to perform an engineering design; and
   (d) packing two or more knowledge components and the data relation and the execution relation thereof into a parent knowledge component without programming, such that the output ports of the data interface and the control interface of any one but the last knowledge component are respectively connected to the input ports of the data interface and the control interface of the immediate next knowledge component, wherein the parent knowledge component comprises:
      (I) a parent data interface having input ports connected the input ports of the data interface of the first knowledge component, and output ports connected the output ports of the data interface of the last knowledge component;
      (II) a parent control interface for defining a logical control relation between the parent knowledge component and the upstream and downstream parent knowledge components thereof, having input ports connected the input ports of the control interface of the first knowledge component, and output ports connected the output ports of the control interface of the last knowledge component;
      (III) a parent human-computer interactive interface having input ports, for managing data input and data output through the data input and output ports of the parent data interface;
      (IV) a parent message interface having input ports, for receiving external messages and information;
      (V) a parent third party tool interface having input ports, for accessing third party tools;
      (VI) a message registration center configured to establish and manage a variety of messages relating to the parent knowledge component, and send the messages to corresponding internal knowledge components to trigger desired activities thereof, wherein the message registration center is connected between the parent message interface and the message input ports of each internal knowledge component;
      (VII) a customizable human-computer interactive interface having a variety of types of human-computer interactive controls including a data control for modifying data of the parent knowledge component and a message control for binding desired messages in the message registration center for calling the corresponding internal knowledge components, wherein the customizable human-computer interactive interface is connected to the parent human-computer interactive interface, the message registration center and the first knowledge component;
      (VIII) a knowledge information index coupled to a knowledge information database and configured to record the index relations of a number of activities of the parent knowledge component and usage specifications, design instructions, experiences and knowledge stored in the knowledge information database, and automatically extract the relevant information from the knowledge information database when the parent knowledge component carries out a certain activity;

(IX) a timer configured to send a time message to the message registration center on the basis of the time point set by the parent knowledge component; and (X) a tool registration center configured to record information of the third party tool connected into the parent knowledge component, wherein the information includes access interfaces, data interfaces, starting mechanisms of the third party tool, wherein in operation, modifying the data of the design process model triggers the design process model to be partially or fully executed dynamically and concurrently with the design process, whereby both the definition and execution of the design process model occurs concurrently.

2. The method of claim 1, wherein each universal module comprises basic operations of file parsing, expression operations, command executions, script executions, computer-aided design (CAD) operations, computer-aided engineering (CAE) operations, database operations and report generations of the corresponding engineering design process.

3. The method of claim 1, wherein when calling the plurality of knowledge components, the data relation of the plurality of knowledge components is automatically established based on the rules.

4. The method of claim 3, wherein when calling the plurality of knowledge components, the execution relation of the plurality of knowledge components is automatically generated based on the rules.

5. The method of claim 1, wherein the design process model is configured such that
(a) the knowledge components are addable, deletable and/or replaceable;
(b) the data relation and the execution relation of the knowledge components are modifiable; and
(c) the control data of the knowledge components is modifiable,
so that the design process model is partially or fully executable.

6. The method of claim 5, wherein the design process model is further configured such that in operation, the human-computer interactive interfaces of the plurality of knowledge components are popped up in a predefined order according to the execution relation of the plurality of knowledge components so as to lead a designer to complete design and analysis work.

7. The method of claim 1, wherein the knowledge components packed in the parent knowledge component is replaceable when the parent knowledge component is called in an engineering design process.

8. The method of claim 1, further comprising the steps of:
(a) establishing a database for storing having instructions, design regulations, design experiences and selected knowledge; and
(b) establishing a relationship between the plurality of knowledge components and the database so as to automatically display the associated knowledge when a knowledge component is used.

9. The method of claim 1,
wherein the logical relations define logical conditions in the execution of the plurality of knowledge components and are established via transferring lines and control logical nodes of the control interfaces of the plurality of knowledge components;
wherein the data driving relations define data conditions in the execution of the plurality of knowledge components and are established via mapping lines between the data interfaces of the plurality of knowledge components;
wherein the time characteristics define time conditions in the execution of the plurality of knowledge components, wherein in operation, a present time is determined via a timer and is compared with a start time set by the plurality of knowledge components, if the start time is achieved, the time conditions are met; and
wherein the message triggering mechanisms regulate random event conditions in the execution of the plurality of knowledge components, wherein in operation, when a random event occurs, a message of the random event is received by the plurality of knowledge components via the message interface, thereby meeting the message triggering condition.

10. The method of claim 1, wherein the data mapping relation between data interfaces of the knowledge components is established in the form of graphics, without programming.

* * * * *